United States Patent
Nishikawa et al.

(10) Patent No.: US 6,486,995 B2
(45) Date of Patent: Nov. 26, 2002

(54) VIBRATION-RESISTING STRUCTURE OF OPTICAL SCANNER

(75) Inventors: Hideaki Nishikawa, Nagoya (JP); Nobuaki Kawahara, Nisshin (JP); Takeshi Matsui, Toyohashi (JP); Makoto Inomata, Handa (JP)

(73) Assignee: Denso Corporation, Kariya (JP)

( * ) Notice: Subject to any disclaimer, the term of this patent is extended or adjusted under 35 U.S.C. 154(b) by 5 days.

(21) Appl. No.: 09/842,732

(22) Filed: Apr. 27, 2001

(65) Prior Publication Data

US 2001/0036000 A1 Nov. 1, 2001

(30) Foreign Application Priority Data

Apr. 28, 2000 (JP) .................... 2000-130179
Dec. 7, 2000 (JP) .................... 2000-373248
Mar. 26, 2001 (JP) .................... 2001-086969

(51) Int. Cl.$^7$ .............................. G02B 26/08
(52) U.S. Cl. ................ 359/198; 359/214; 359/225
(58) Field of Search ............... 359/197, 198, 359/199, 212, 213, 214, 223, 224, 225

(56) References Cited

U.S. PATENT DOCUMENTS 5,926,307 A * 7/1999 Tanaka et al. ........... 359/198
5,982,521 A 11/1999 Bessho et al. .......... 359/198

FOREIGN PATENT DOCUMENTS

| JP | 2-101422 | 4/1990 |
| JP | 3-150733 | 6/1991 |
| JP | 3-49409 | 7/1991 |
| JP | 3-260924 | 11/1991 |
| JP | 9-138366 | 5/1997 |

* cited by examiner

Primary Examiner—Mark A. Robinson
(74) Attorney, Agent, or Firm—Law Offices of David G. Posz

(57) ABSTRACT

An optical scanner and a two-dimensional scanning device using the same are provided. The optical scanner includes a scanning mechanism and a swing support. The swing support is designed to support the scanning mechanism on a housing so as to allow the scanning mechanism to swing and made up of a plurality of springs. The springs are so constructed so as resist unwanted vibrations acting on the optical scanner in directions different from a scan direction, thereby ensuring a stable scan of a light beam at all the time.

15 Claims, 17 Drawing Sheets

VIBRATION-RESISTING STRUCTURE OF OPTICAL SCANNER

BACKGROUND OF THE INVENTION

1. Technical Field of the Invention

The present invention relates generally to an optical scanner which may be used in a laser scanning bar code reader or a laser scanning obstacle detector for automotive vehicles, and more particularly to an improved vibration-resisting structure of an optical scanner capable of scanning a given range accurately free from vibrational disturbances and a two-dimensional scanning device using the same.

2. Background Art

Japanese Patent First Publication No. teaches a low-cost optical scanner for use in emitting a laser beam in a bar coder reader or an obstacle detector. This scanner has a mirror-finished magnet supported by a torsion spring and subjects the magnet to an alternating field to move the magnet in a direction in which the torsion spring is twisted so that light from a source is reflected on the magnet to scan a target.

In the above scanner, increasing a scan angle requires decreasing the diameter of the torsion spring to 140 $\mu$m to increase the degree of elastic deformation thereof. This, however, encounters the drawback in that the torsion spring is extended or bent easily in a direction different from a twisted direction required for a scanning operation. In other words, the magnet supported by the torsion spring undesirably undergoes vibrations in various directions different from the twisted direction required for the scanning operation. Thus, in a case where the scanner is installed in an automotive vehicle for obstacle detection, strong acceleration-caused vibrational disturbances act on the magnet, thereby resulting in undesirable deflection of a scanning beam.

SUMMARY OF THE INVENTION

It is therefore a principal object of the invention to avoid the disadvantages of the prior art.

It is another object of the invention to provide an optical scanner designed to keep the deflection of a scanning beam to a minimum even when the scanner undergoes vibrational disturbances in various directions and a two-dimensional scanning system using the same.

According to one aspect of the invention, there is provided an optical scanner which may be employed in a laser beam bar code reader or an automotive obstacle detector equipped with a radar. The optical scanner comprises: (a) a housing; (b) a scanning mechanism constructed to be swingable about a given swing line to emit a light beam for scanning a given angular range, the scanning mechanism including a base and an inertia body projecting from the base toward the given swing line; (c) a support supporting the scanning mechanism on the housing so as to allow the scanning mechanism to swing, the support including a plurality of elastic plates each having a length one end of which is attached to the housing and other end of which is attached to the base of the scanning mechanism so that the elastic plates intersect each other with an offset on a line parallel to the given swing line, each of the elastic plates having a width in a direction parallel to the given swing line; and (d) a driver swinging the scanning mechanism to direct the light beam to the given angular range.

In the preferred mode of the invention, the inertia body is so provided that the center of gravity of the scanning mechanism is defined on the given swing line.

The inertia body may include a gravity center location adjusting mechanism capable of adjusting a location of the center of gravity of the scanning mechanism.

The base of the scanning mechanism has formed thereon a reflecting surface for reflecting the light beam emitted from a light source toward the given angular range.

The base of the scanning mechanism may have a mount extension plastically bent from at least one of ends thereof opposed in a direction parallel to the given swing line. The inertia body is mounted on the mount extension.

The mount extension may have a holder in which the inertia body is press fit.

The elastic plates have the same length between the housing and the scanning mechanism.

The elastic plates may be implemented by a first hollow rectangular spring plate and a second hollow rectangular spring plate. The second hollow rectangular plate passes through an opening of the first hollow rectangular plate so as to intersect the first hollow rectangular plate with the offset on the line parallel to the given swing line.

The elastic plates may alternatively be implemented by a first and a second U-shaped spring plate each including a base portion and a pair of arms extending from the base portion at an interval away from each other. The interval is greater than a width of the arms. One of the arms of the first U-shaped spring plate passes between the arms of the second U-shaped spring plate.

Each of the elastic plates may have rigidity resistant to change in form thereof which increases as approaching a portion of the elastic plate joined to the housing from a portion of the elastic plate joined to the scanning mechanism. This may be achieved by increasing the width of each of the elastic plates toward the housing.

Each of the elastic plate has the ends press fit in portions of the housing and the scanning mechanism, respectively.

Each of the housing and the scanning mechanism has ends opposed in a direction perpendicular to the given swing line. Each of the ends is bent to hold a corresponding one of the ends of the elastic plates tightly to join the housing and the scanning mechanism together.

Each of the elastic plates is joined to the housing and the scanning mechanism while undergoing elastic deformation.

Each of the elastic plates may have clips which are fitted on the end of the housing and the end of the scanning mechanism to join the housing and the scanning mechanism together.

Each of the housing and the scanning mechanism may have connecting portions each of which is connected to one of the ends of the elastic plates. Either of the connecting portions and the ends of the elastic plates has a protrusion, and the other has an engaging portion engaging the protrusion for securing a positional relation therebetween.

The driver includes a permanent magnet mounted on the scanning mechanism and a solenoid disposed opposite the permanent magnet. When energized, the solenoid produces a magnetic field varying periodically around the permanent magnet to swing the scanning mechanism.

The permanent magnet may also serve as the inertia body.

The permanent magnet has two magnetic poles arrayed perpendicular to the given swing line and is so located as to face a central portion of the permanent magnet when the scanning mechanism is at rest.

The driver may alternatively include a permanent magnet mounted on the scanning mechanism and two solenoids. The permanent magnet has magnetic poles arrayed parallel to the given swing line. The solenoid is disposed across one of the magnetic poles of the permanent magnet.

The driver may also have a magnetic field strength measuring device which measures a change in strength of a magnetic field of the permanent magnet caused by a swing of the scanning mechanism and outputs a signal indicative thereof.

The driver also includes a control circuit which is responsive to the signal outputted from the magnetic field strength measuring device to control energization of the solenoid so as to bring a swing of the scanning mechanism into a given condition.

The control circuit energizes the solenoid intermittently. The magnetic field strength measuring device uses the solenoid when deenergized to measure the change in strength of the magnetic field of the permanent magnet.

The driver may alternatively include piezoelectric devices adhered to the elastic plates which are so energized as to expand and contract the elastic plates in a cycle to swing the scanning mechanism.

The driver swings the scanning mechanism at a resonance frequency determined by mass of the scanning mechanism and spring constants of the elastic plates.

According to another aspect of the invention, there is provided a two-dimensional scanning device which comprises: (a) a first scanner directing a light beam emitted from a light source to a first scan direction; and (b) a second scanner directing the light beam inputted from the first scanner to a second scan direction traversing the first scan direction. Either or both of the first and second scanner include: (a) a housing; (b) a scanning mechanism constructed to be swingable about a given swing line to emit a light beam for scanning a given angular range, the scanning mechanism including a base and an inertia body projecting from the base toward the given swing line; (c) a support supporting the scanning mechanism on the housing so as to allow the scanning mechanism to swing, the support including a plurality of elastic plates each having a length one end of which is attached to the housing and other end of which is attached to the base of the scanning mechanism so that the elastic plates intersect each other with an offset on a line parallel to the given swing line, each of the elastic plates having a width in a direction parallel to the given swing line; and (d) a driver swinging the scanning mechanism to direct the light beam to the given angular range.

According to a further aspect of the invention, there is provided an optical scanner which comprises: (a) a housing including a pair of arms extending in the same direction; (b) a scanning mechanism constructed to be swingable about a given swing line to emit a light beam for scanning a given angular range; (c) a support supporting the scanning mechanism on the housing so as to allow the scanning mechanism to swing, the support including a pair of elastic plates surrounded by the arms of the housing, each of the elastic plates having a housing-attachment strip and a scanning mechanism-attachment strip, the housing-attachment strip having a bent end attached to an end of one of the arms of the housing, the scanning mechanism-attachment strip having a bent end attached to the scanning mechanism, the elastic plates being arranged adjacent each other so that ridges defined by bends of the ends of the housing-attachment strips and the scanning mechanism-attachment strips are arrayed along a line; and (d) a driver swinging the scanning mechanism about the line along which the ridges of the housing-attachment strips and the scanning mechanism-attachment strips are arrayed for directing the light beam to the given angular range.

In the preferred mode of the invention, the scanning mechanism has a reflecting surface for reflecting the light beam emitted from a light source toward the given angular range.

The center of gravity of the scanning mechanism is defined on the line along which the ridges of the housing-attachment strips and the scanning mechanism-attachment strips are arrayed.

The driver swings the scanning mechanism at a resonance frequency determined by mass of the scanning mechanism and spring constants of the elastic plates.

The driver includes a permanent magnet mounted on the scanning mechanism and a solenoid disposed opposite the permanent magnet. When energized, the solenoid produces an alternating field to move the permanent magnet, thereby swinging the scanning mechanism.

The permanent magnet is mounted on one of ends of the scanning mechanism opposed to each other in a direction of a swing of the scanning mechanism.

An inertia body may also be mounted on the other end of the scanning mechanism which adjusts the center of gravity of the scanning mechanism to a desired location.

Second inertia bodies may also be mounted on ends of the scanning mechanism opposed to each other in a direction parallel to the line about which the scanning mechanism swings.

The scanning mechanism has arms extending to a side of emission of the light beam to mount the second inertia bodies thereon.

Each of the elastic plates also has a second scanning mechanism-attachment strip. The housing-attachment strip is arranged between the scanning mechanism-attachment strip and the second scanning mechanism-attachment strip.

Each of the elastic plates has formed therein slits to define the housing-attachment strip and the scanning mechanism-attachment strips.

An end of each of the slits is rounded.

Each of the elastic plates may have a waved portion connecting between the housing-attachment strip and the scanning mechanism attachment strip.

Each of the elastic plates is made of a spring plate which has the housing-attachment strip formed on a first end thereof and the scanning mechanism-attachment strip formed on a second end opposite the first end and which is so deformed elastically that the ridges defined by the bends of the ends of the housing-attachment strips and the scanning mechanism-attachment strips are arrayed along the line about which the scanning mechanism swings.

The elastic plates are connected to each other to define a one-piece spring plate which has the housing-attachment strip and the scanning mechanism-attachment strip formed on each of opposed ends thereof.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
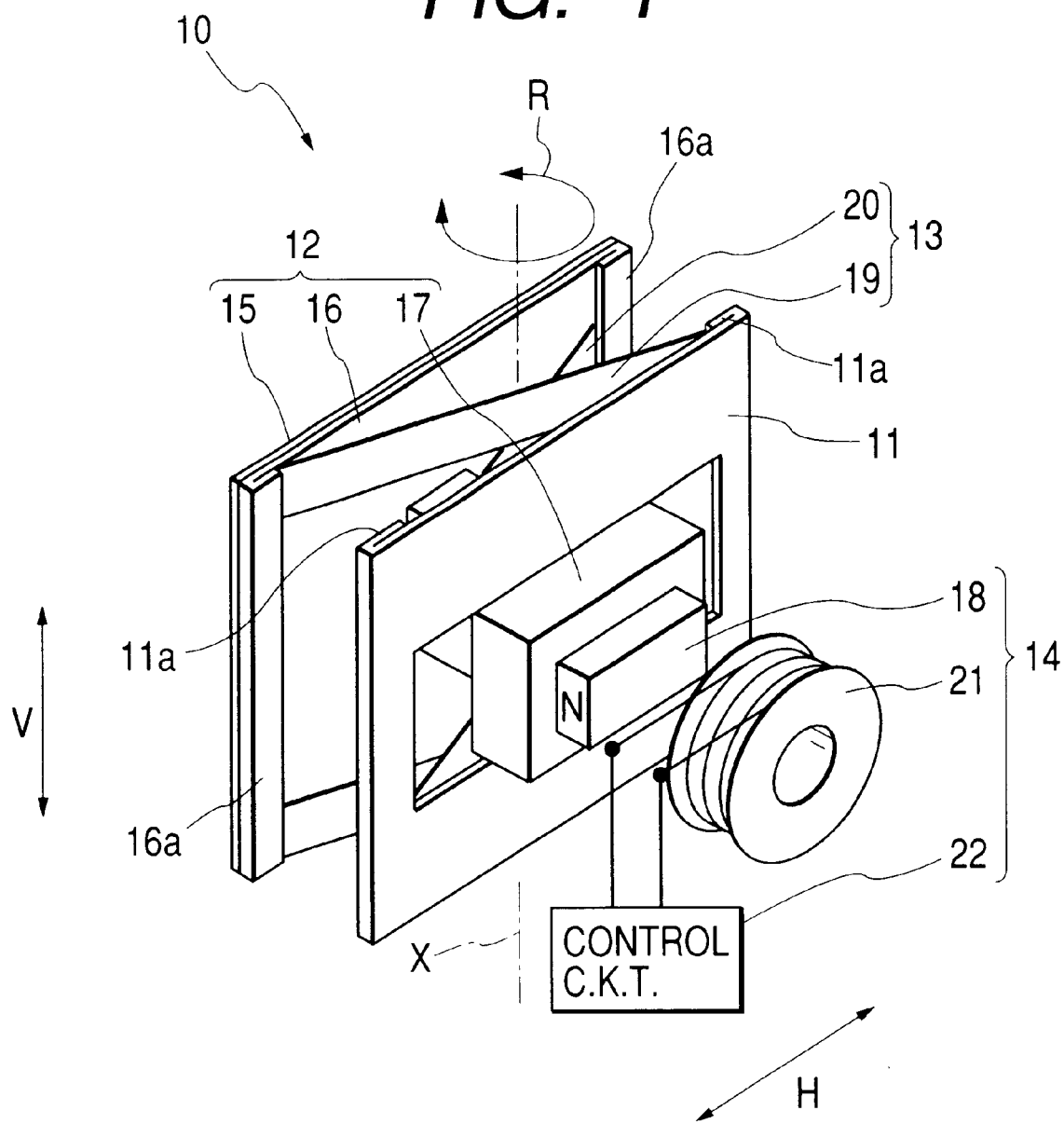
FIG. 1 is a perspective view which shows an overall structure of an optical scanner according to the present invention.

Referring to the drawings, wherein like reference numbers refer to like parts in several views, particularly to FIG. 1, there is shown an optical scanner 10 according to the first embodiment of the invention.

The optical scanner 10 includes generally a housing 11, a scanning mechanism 12, a swing support 13, and a driver 14. The housing 11 is mounted on a chassis of, for example, a bar code reader or an automotive obstacle detector. The scanning mechanism 12 is mechanically carried by the swing support 13 to be swingable over a given scan range. The driver 14 controls the movement of the scanning mechanism 12.

The scanning mechanism 12 includes a reflecting mirror 15, a mirror-mount 16 (i.e., a base of the scanning mechanism 12), and an inertia body 17. The mirror-mount 16 is made of a rectangular metallic plate machined in a thickness of approximately 0.5 mm and has the reflecting mirror 15 adhered to a surface thereof and the inertia body 17 installed on the opposite surface using screws. The mirror-mount 16 also has ends 16a folded inward on the inertia body-mounted surface.

The reflecting mirror 15 is made of a glass plate whose thickness is of the order of 0.2 mm on which aluminum is deposited for reflecting incoming light. In a case where light outputted from a light source has a constant wavelength like an infrared light, a thin film capable of reflecting that light may alternatively be formed on the glass plate.

The inertia body 17 has a permanent magnet 18 installed on a surface thereof opposite the mirror-mount 16 (which will be referred to as a rear surface below).

The housing 11 is made of a hollow rectangular metallic plate machined in a thickness of approximately 0.5 mm which has ends 11a folded inward on a surface facing the scanning mechanism 12. The housing 11 has an opening within which a rear portion of the inertia body 17 is disposed. The size of the opening is large enough to allow movement of the inertia body 17 without any hit as long as the scanning mechanism 12 is swung in a permissible range.

The swing support 13 includes first and second springs 19 and 20 each made of a stainless steel plate having a thickness of approximately 0.05 mm which is formed to a hollow rectangular shape by etching or punching. The second spring 20, as clearly shown in FIG. 2, has formed therein a rectangular opening whose size is large enough for the inertia body 17 to be disposed. Similarly, the first spring 19 has formed therein a rectangular opening whose vertical dimension or width L1 is slightly greater than the overall width L2 of the second spring 20.

The second spring 20 is so arranged as to traverse the opening of the first spring 19. Specifically, the first and second springs 19 and 20 intersect each other three-dimensionally. Each of the first and second springs 19 and 20 is retained at one end by one of the folded ends 11a of the housing 11 and at the other end by one of the folded ends 16a of the mirror-mount 16.

Figure 2:
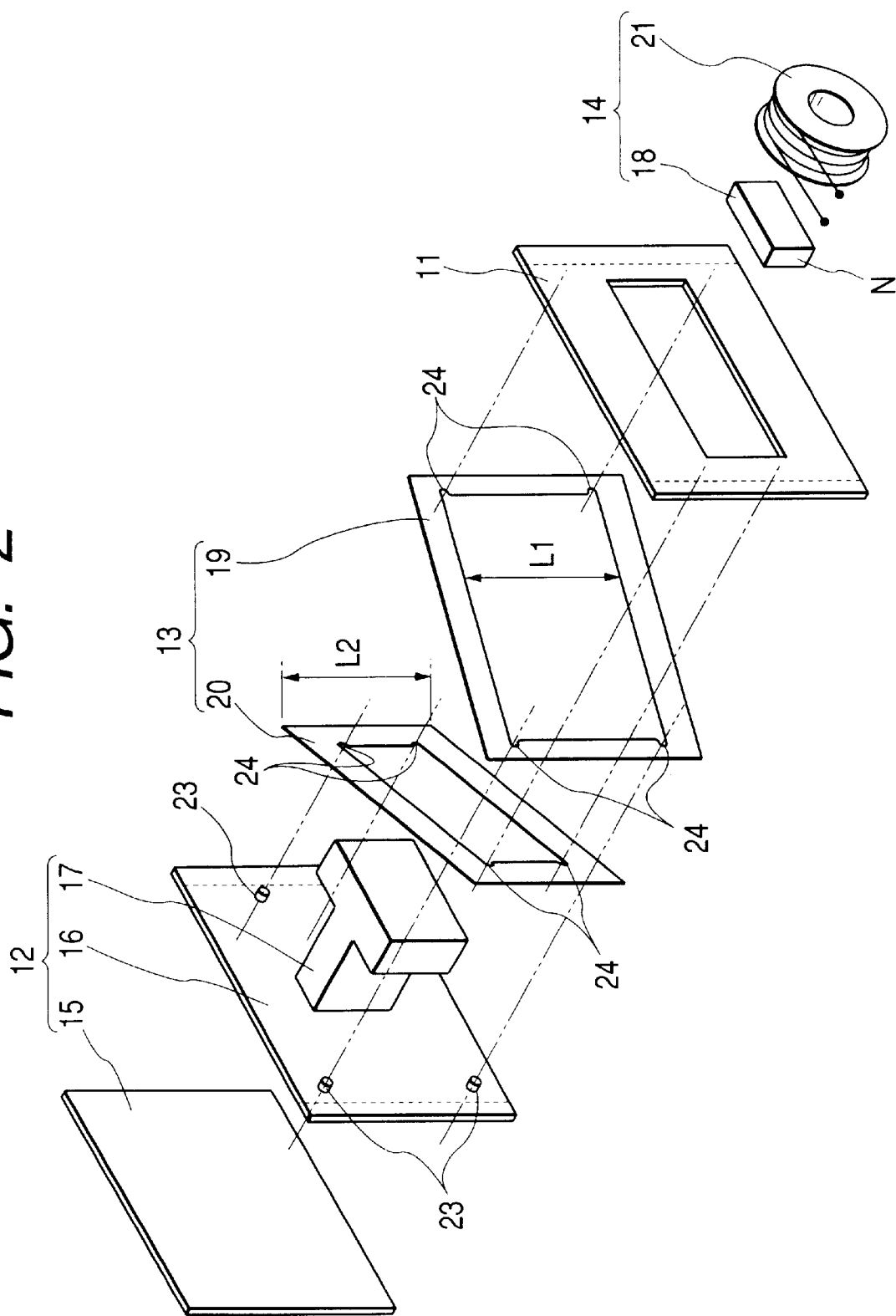
FIG. 2 is an exploded view which shows the optical scanner of FIG. 1.

The first and second springs 19 and 20, as shown in FIG. 2, each have four cut-out portions 24 formed in corners of the openings. The mirror-mount 16 has four protrusions 23 formed using a press on right and left sides, as viewed in the drawing, on a rear surface thereof facing the swing support 13. The two left protrusions 23 of the mirror-mount 16 are so formed as to be fitted in the left cut-out portions 24 of the first spring 19, while the two right protrusions 23 are so formed as to be fitted in the right cut-out portions 24 of the second spring 20. Similarly, the housing 11 has four protrusions (not shown) formed on right and left sides on a front surface thereof which is invisible in FIG. 2. The two right protrusions of the housing 11 are so formed as to be fitted in the right cut-out portions 24 of the first spring 19, while the two left protrusions are so formed as to be fitted in the left cut-out portions 24 of the second spring 20. The first and second springs 19 and 20 are equal in length with each other.

Steps of joining the first and second springs 19 and 20 to the housing 11 and the mirror-mount 16 in an assembling process of the optical scanner 10 will be discussed below.

First, the first and second springs 19 and 20 are fitted at the cut-out portions 24 on the protrusions 23 of the mirror-mount 16 to position them relative to each other. The ends of the mirror-mount 16 are turned inward along broken lines to nip the left side of the first spring 19 and the right side of the second spring 20. The turned ends are further pressed to hold the sides of the first and second springs 19 and 20 tightly (see the folded ends 16a in FIG. 1). Next, the right side of the first spring 19 and the left side of the second spring 20 are pulled and fitted at the cut-out portions 24 on the protrusions (not shown) of the housing 11. The ends of the housing 11 are turned inward along broken lines to nip the right side of the first spring 19 and the left side of the second spring 20. The turned ends are further pressed to hold the sides of the first and second springs 19 and 20 tightly (see the folded ends 11a in FIG. 1). This fabricates the swing support 13 in which the first and second springs 19 and 20 traverse each other to join the scanning mechanism 12 and the housing 11 together.

The inertia body 17 attached to the mirror-mount 16 is disposed through the openings of the first and second springs 19 and 20 and the housing 11. The shape and weight of inertia body 17 are so selected that the center of gravity of an assembly of the scanning mechanism 12 and the permanent magnet 18 lies near or on a line passing through intersection of the first and second springs 19 and 20. The inertia body 17 has threaded holes formed in a rear surface thereof into which screws are inserted. The fine adjustment of a location of the center of gravity of the scanning mechanism 12 is achieved by changing the amount by which the screws are inserted into the threaded holes.

The housing 11 is, as described above, secured on the chassis of the scanning device. The scanning mechanism 12 is swung, as indicated by an arrow R in FIG. 1, about an axis X extending near or through the intersection of the first and second springs 19 and 20.

The driver 14, as shown in FIG. 1, consists of the permanent magnet 18 adhered to the rear surface of the inertia body 17, a solenoid 21, and a control circuit 22. The permanent magnet 18 has magnetic poles arrayed along the length of the housing 11 (i.e., a horizontal direction H in FIG. 1). The solenoid 21 is so arranged as to face the center of the permanent magnet 18 or the middle between the magnetic poles of the permanent magnet 18. Specifically, when the solenoid 21 produces the N-magnetic pole on a front surface facing the permanent magnet 18, it will cause the S-magnetic pole of the permanent magnet 18 to be attracted to the solenoid 21, while the N-magnetic pole thereof repels the solenoid 21, so that the scanning mechanism 12 undergoes a moment of force in clockwise direction, as viewed in FIG. 1. Conversely, when the solenoid 21 produces the S-magnetic pole on the front surface, it will cause the N-magnetic pole of the permanent magnet 18 to be attracted to the solenoid 21, while the S-magnetic pole thereof repels the solenoid 21, so that the scanning mechanism 12 undergoes a moment of force in counter-clockwise direction, as viewed in FIG. 1.

Specifically, when the control circuit 22 outputs a periodic drive signal in the form of a sine wave or a rectangular wave to energize the solenoid 21, the solenoid 21 will produce an alternating field which induces the scanning mechanism 12 to swing about the axis X by the interaction between the alternating field and the magnetic field of the permanent magnet 18. This causes a light beam incident on the reflecting mirror 15 to scan a plane one-dimensionally which extends perpendicular to the axis X. The scan velocity of the light beam may be controlled by changing the cycle of the swing of the scanning mechanism 12, that is, the frequency of the drive signal applied to the solenoid 21. The scan range of the light beam may be modified by changing the degree of the swing of the scanning mechanism 12, that is, the amplitude of the drive signal (i.e., the voltage level) applied to the solenoid 21. In this embodiment, the frequency of the drive signal outputted by the control circuit 22 is set identical with the resonance frequency which is determined by the moment of inertia of the scanning mechanism 12 (i.e., mass) and the spring constants of the first and second springs 19 and 20 so that the scanning mechanism 12 may swing at the resonance frequency.

If an excessive drive signal is applied to the solenoid 21 so that the amplitude of the swing of the scanning mechanism 12 exceeds a desired level, the inertia body 17 hits on an edge of the opening of the housing 11, thereby delimiting the range of the swing of the scanning mechanism 12.

As apparent from the above discussion, the swing support 13 which retains the scanning mechanism 12 to be swingable horizontally has the structure in which the first and second springs 19 and 20 intersect each other three-dimensionally. The width of the first and second springs 19 and 20 is oriented in a direction V, as shown in FIG. 1, which is parallel to the axis X about which the scanning mechanism 12 swings. Specifically, each of the first and second springs 19 and 20 is lower in rigidity resistant to deformation in the direction R of the swing of the scanning mechanism 12, but higher in rigidity resistant to deformation in other directions, especially the direction V parallel to the axis X about which the scanning mechanism 12 swings.

Further, the center of gravity of the scanning mechanism 12 is located near or on the axis X about which the scanning mechanism 12 swings, thereby minimizing the moment of force disturbing the scanning operation of the scanning mechanism 12.

Specifically, even if the optical scanner 10 undergoes any acceleration disturbing the scanning operation, the swing support 13 works to minimize the moment of force inducing unwanted vibrations of the scanning mechanism 12. Therefore, in a case where the optical scanner 10 is mounted in an automotive vehicle, the scanning mechanism 12 scans a desired range precisely.

The inertia body 17 is built in the scanning mechanism 12. The location of the center of gravity and the resonance frequency of the scanning mechanism 12 may be adjusted by changing the shape and/or the weight of the inertia body 17 for providing desired vibrational characteristics to the optical scanner 10.

Further, fine adjustment of the center of gravity of the scanning mechanism 12 may be, as described above, accomplished by changing the amount by which the screws are inserted into the threaded holes formed in the inertia body 17, thereby eliminating a variation in location of the center of gravity of the scanning mechanism 12 caused by dimensional errors of the optical scanner 10 in manufacturing processes.

The first and second springs 19 and 20 intersect each other three-dimensionally to support the swing of the scanning mechanism 12. The friction is, thus, not taken place in the scanning mechanism 12, thereby resulting in an increase in durability of the scanning mechanism 12. Moreover, the opening of the housing 11 serves to avoid excessive movement of the inertia body 17, thus avoiding undesirable deformation or breakage of the swing support 13 (i.e., the first and second springs 19 and 20).

The use of a simple physical structure of the driver 14 made up of the permanent magnet 18 and the solenoid 21 results in a decrease in overall manufacturing costs of the optical scanner 10. The scanning mechanism 12 is designed to swing at the resonance frequency thereof, thereby enabling a greater degree of swing to be achieved with a small driving force, thus resulting in a decrease in consumption of power in the driver 14.

The first and second springs 19 and 20 have the same length. In assembling, the positioning of the housing 11 and the mirror-mount 16 is achieved by fitting the protrusions formed on the housing 11 and the mirror-mount 16 in the cut-out portions of the first and second springs 19 and 20. This facilitates ease of symmetrical fabrication of the housing 11 and the scanning mechanism 12. The symmetrical fabrication also minimizes unwanted vibrations of the optical scanner 10, thus resulting in improved reliability of the scanning operation.

The swing of the scanning mechanism 12 is accomplished by elastic deformation of the first and second springs 19 and 20 and not plastic deformation thereof. The first and second springs 19 and 20 do not undergo the springback. Moreover, the installation of the first and second springs 19 and 20 on the housing 11 and the mirror-mount 16 is achieved by nipping the ends of the first and second springs 19 and 20 by overall surfaces of the folded ends 11a and 16a of the housing 11 and the mirror-mount 16. The stress, therefore, does not concentrate at the first and second springs 19 and 20 partially, thereby ensuring the symmetrical scanning operation.

The use of the folded ends 11a and 16a for the installation of the first and second springs 19 and 20 eliminates the need for any other mount member, thus resulting in a decrease in number of parts making up the optical scanner 10.

Figure 3A:
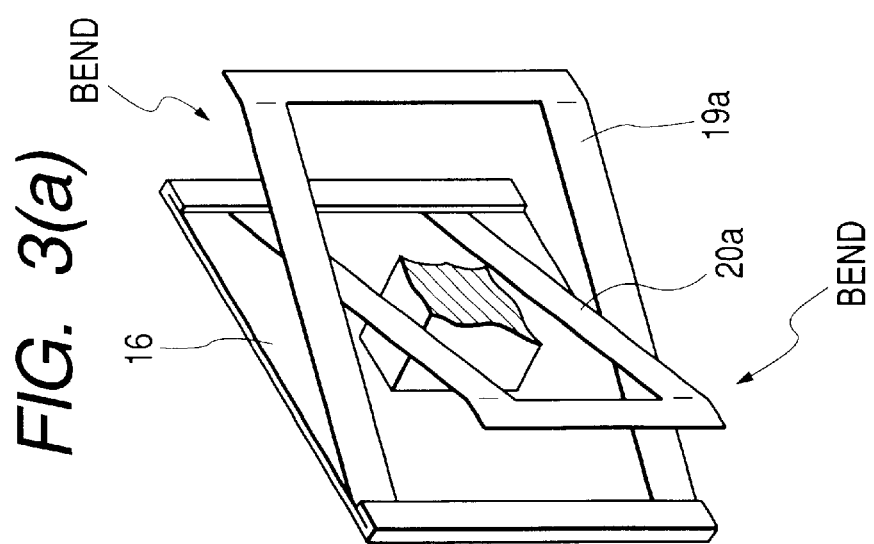
FIGS. 3(a), 3(b), and 3(c) are perspective views which show modifications of a swing support working to support a swing of a scanning mechanism.

The first and second springs 19 and 20 that are flat completely are employed, however, first and second springs 19a and 20a, as shown in FIG. 3(a), may be employed whose ends to be nipped in the folded ends 11a and 16a of the housing 11 and the mirror-mount 16 are curved plastically without being deformed elastically after installation.

Figure 3B:
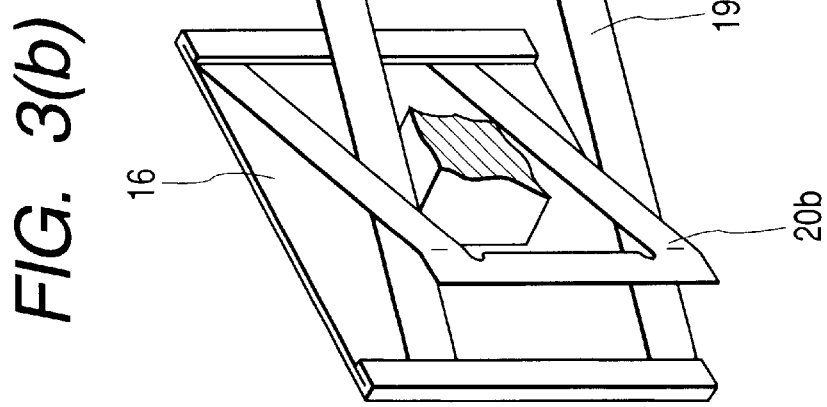

Springs 19b and 20b, as shown in FIG. 3(b), may alternatively be used each of which is made of a U-shaped strip. Horizontal beams of the springs 20b and 19b are fixed at ends thereof on the mirror-mount 16 and the housing 11 so as to overlap with each other alternately in a vertical direction. In this case, the springs 19b and 20b may have the same shape and size, which results in a decrease in number of parts making up the optical scanner 10.

Figure 3C:
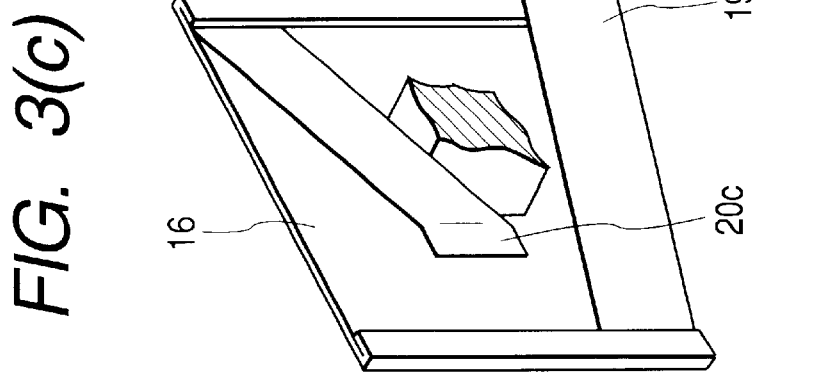

Springs 19c and 20c, as shown in FIG. 3(c), each of which is made of a straight metal strip may also be employed. Ends of the springs 19c and 20c, like the ones of FIGS. 3(a) and 3(b), may be bent and nipped in the folded ends 11a and 16a of the housing 11 and the mirror-mount 16.

Figure 4A:
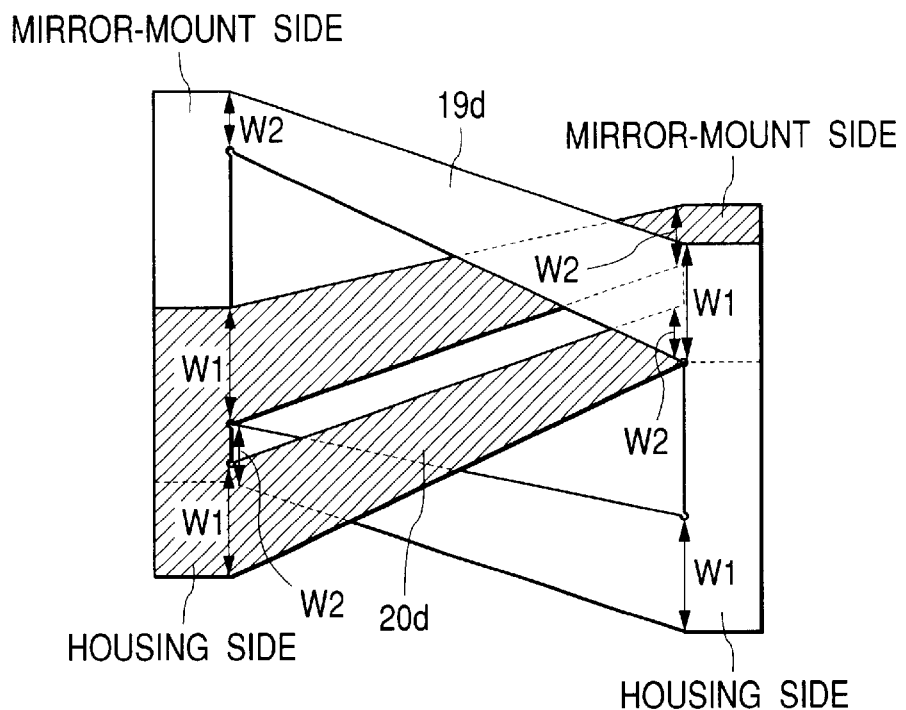
FIGS. 4(a) and 4(b) are front views which show modifications of a swing support working to support a swing of a scanning mechanism.

The horizontal beams of the springs 19 and 20 extending between the housing 11 and the mirror-mount 16 have the same width, however, springs 19d and 20d, as shown in FIG. 4(a), whose horizontal beams have continuously varying widths may alternatively be employed. Specifically, each of the horizontal beams has width W1 maximized at a portion joined to the housing 11 and width W2 minimized at a portion joined to the mirror-mount 6. The outward form of the spring 19d is rectangular, and the opening thereof is trapezoidal in shape, while the outward form of the spring 20d is trapezoid, and the opening thereof is rectangular in shape.

The rate of variation in width of each of the horizontal beams of the springs 19d and 20d is so selected as to provide the rigidity increasing toward the folded end 11a of the housing 11 as a function of a variation in moment of force acting on the horizontal beam during the swing of the scanning mechanism 12. This causes the horizontal beams of the springs 19d and 20d to be deformed uniformly during oscillation of the swing support 13 inducing the swing of the scanning mechanism 12, thus avoiding the concentration of stress at the springs 19d and 20d, which results in an increase in durability of the swing support 13.

Figure 4B:
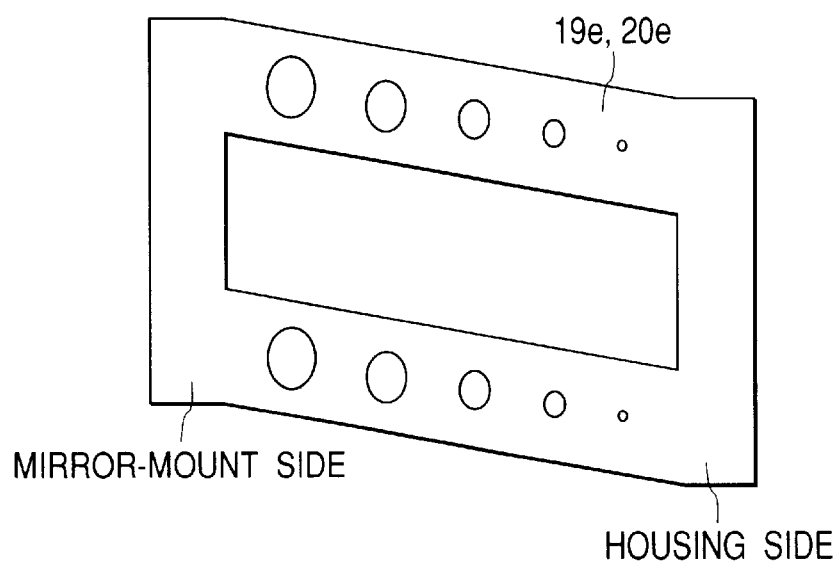

Springs 19e and 20e, as shown in FIG. 4(b), may alternatively be used in which each horizontal beam has formed therein holes whose diameters become smaller toward an end to be joined to the housing 11. Like the springs 19d and 20d of FIG. 4(a), the rigidity of each of the horizontal beams of the springs 19e and 20e increases toward the housing 11, thus avoiding the concentration of stress during the oscillation of the springs 19e and 20e. Instead of the holes, the thickness of each of the horizontal beams may be increased toward the end to be joined to the housing 11 to vary the rigidity similar to the above.

Figure 5:
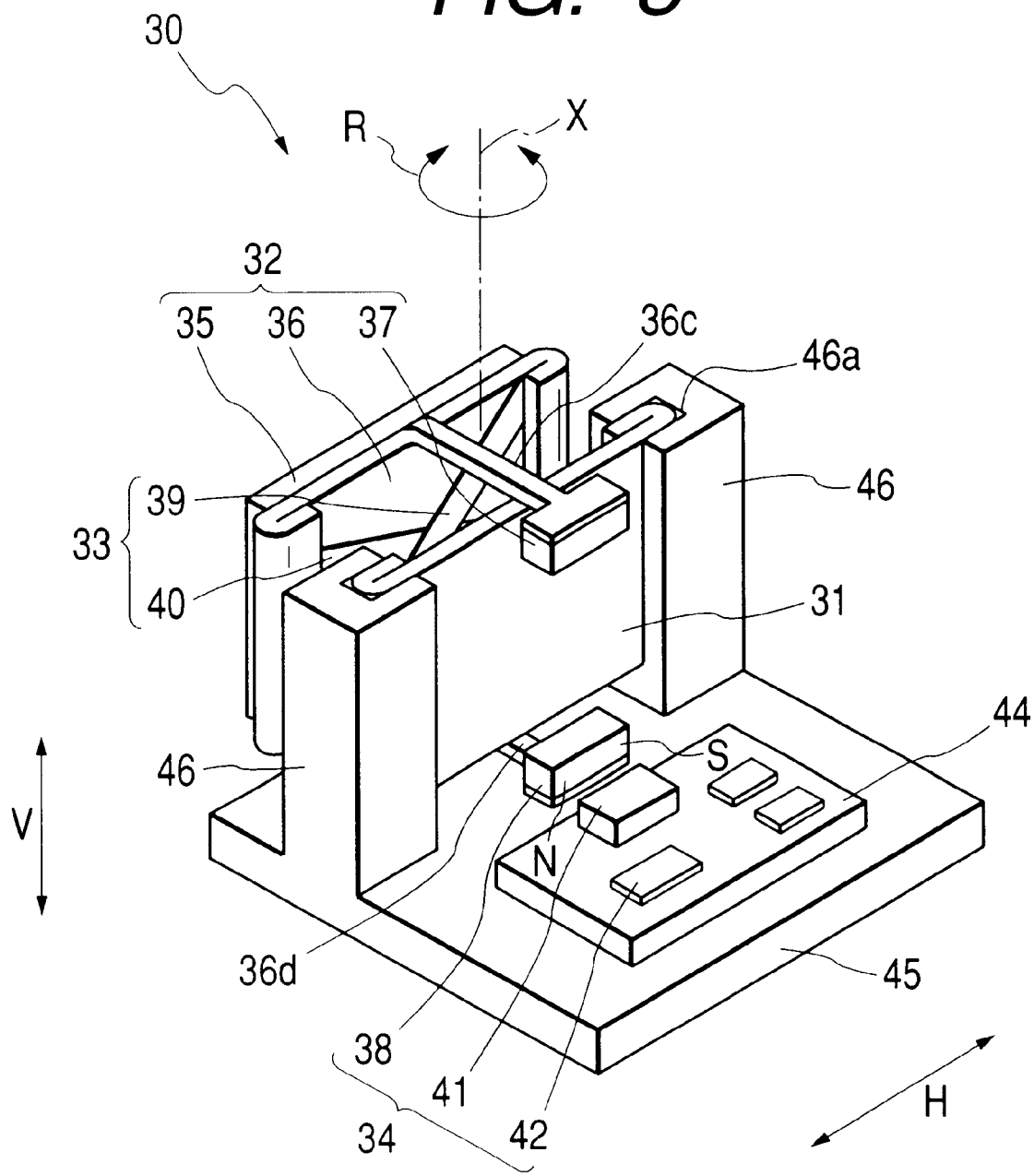
FIG. 5 is a perspective view which shows an optical scanner according to the second embodiment of the invention.
Figure 6:
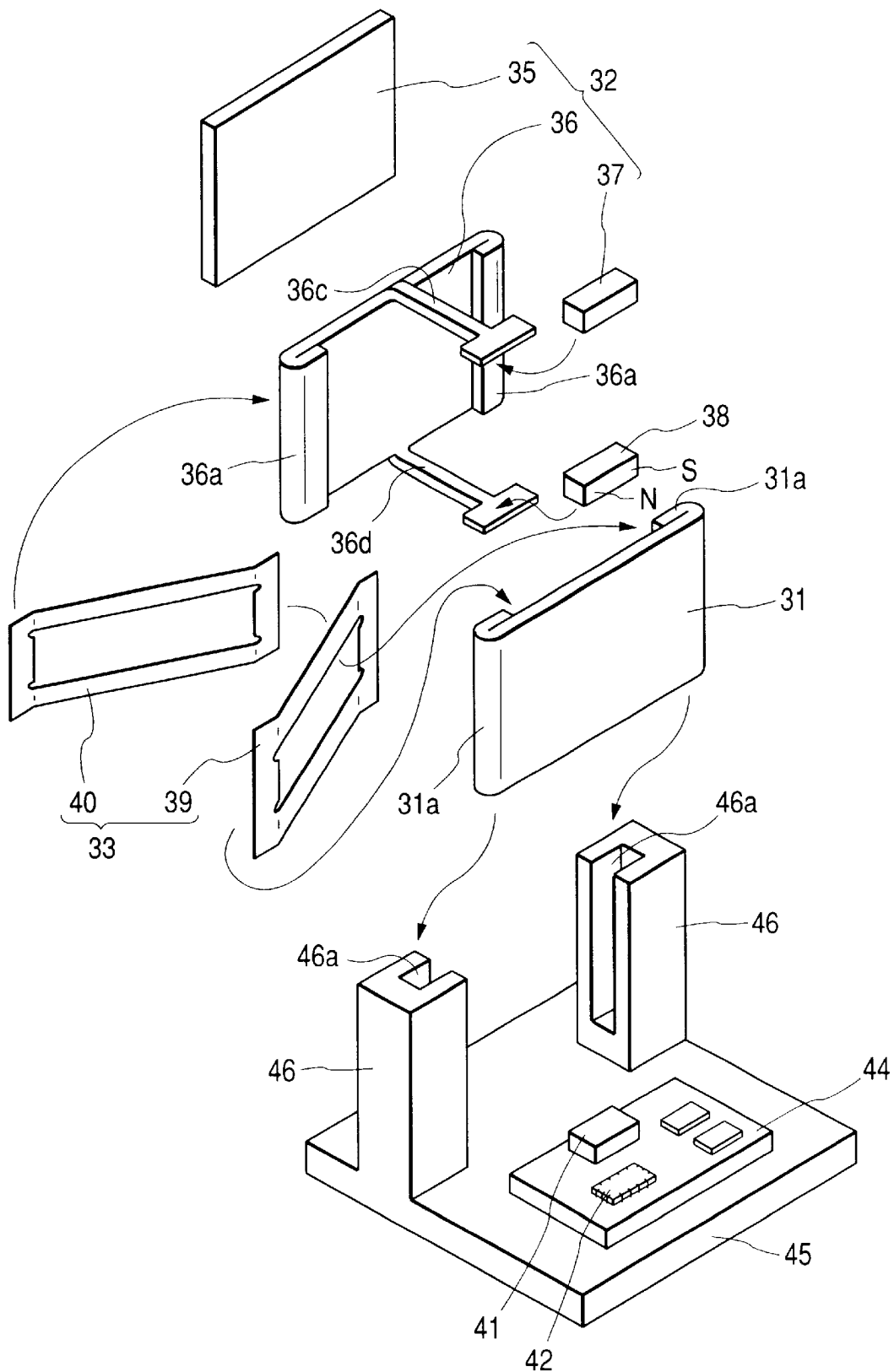
FIG. 6 is an exploded view which shows the optical scanner of FIG. 5.

FIGS. 5 and 6 show an optical scanner 30 according to the second embodiment of the invention.

The optical scanner 30, like the first embodiment, includes a housing 31, a scanning mechanism 32, a swing support 33, and a driver 34. The swing support 33 has the same structure as that of the swing support 13 in the first embodiment.

The optical scanner 30 also includes a base 45 on which the driver 34 and a circuit board 44 are mounted. A pair of upright struts 46 are installed on the upper surface of the base 45. Each of the upright struts 46 has formed therein a vertically extending groove 46a in which one of folded ends 31a of the housing 31 is retained to hold the housing 31 at a given interval away from the upper surface of the base 45.

The housing 31 is made of a stainless steel plate machined using a punch and has folded ends 31a similar to the folded ends 11a in the first embodiment. The housing 31 is the same as the housing 11 of the first embodiment except for the opening.

The scanning mechanism 32 includes a reflecting mirror 35 that is the same as the mirror 15 in the first embodiment, a mirror-mount 36, and a pair of inertia bodies 37 and 38. The inertia bodies 37 and 38 are mounted on T-shaped arms 36c and 36d extending horizontally from edges of the mirror-mount 36. The arms 36c and 36d are formed integrally with the mirror-mount 36. The mirror-mount 36 is made of a rectangular stainless steel plate machined using a punch and has the reflecting mirror 35 adhered to a front surface thereof. The mirror-mount 36 has folded ends 36a and the arms 36c and 36d bent at right angles to a rear surface thereof.

The arms 36a and 36d extend from upper and lower edges of the mirror-mount 36 across upper and lower edges of the housing 31 at a distance therefrom and have the inertia bodies 37 and 38 adhered to ends thereof located behind the housing 31. The inertia body 38 installed on the lower arm 36d is made of a permanent magnet whose magnetic poles are arrayed in a lengthwise direction of the housing 31 (i.e., a horizontal direction H, as shown in FIG. 5).

The overall shape and weight of the scanning mechanism 32 are so selected that the center of gravity thereof lies near or on a vertical line extending through an intersection of first and second springs 39 and 40 of the swing support 33.

On the circuit board 44 mounted on the base 45, a solenoid 41 and a driver IC 42 are installed. The driver IC 42 energizes the solenoid 41 to oscillate or swing the scanning mechanism 32 in the same manner as that described in the first embodiment.

Other arrangements are identical with those in the first embodiment, and explanation thereof in detail will be omitted here.

The solenoid 41 is fixed on the base 45 at a preselected interval away from the permanent magnet 38, thus eliminating the need for an additional step of adjusting the interval between the solenoid 41 and the permanent magnet 38 when the optical scanner 30 is installed in a scanning device such as a bar code reader or an automotive obstacle detector.

The first and second springs 39 and 40 may be joined to the housing 31 and the mirror-mount 36 either by nipping or welding the ends of the springs 39 and 40 in or to the folded ends 31a and 36a. A snap mechanism may alternatively be used to join the springs 39 and 40 to the housing 31 and the mirror-mount 36.

The inertia bodies 37 and 38 may be installed on the arms 36c and 36d by means of a snap mechanism as well as adhesive.

Figure 7:
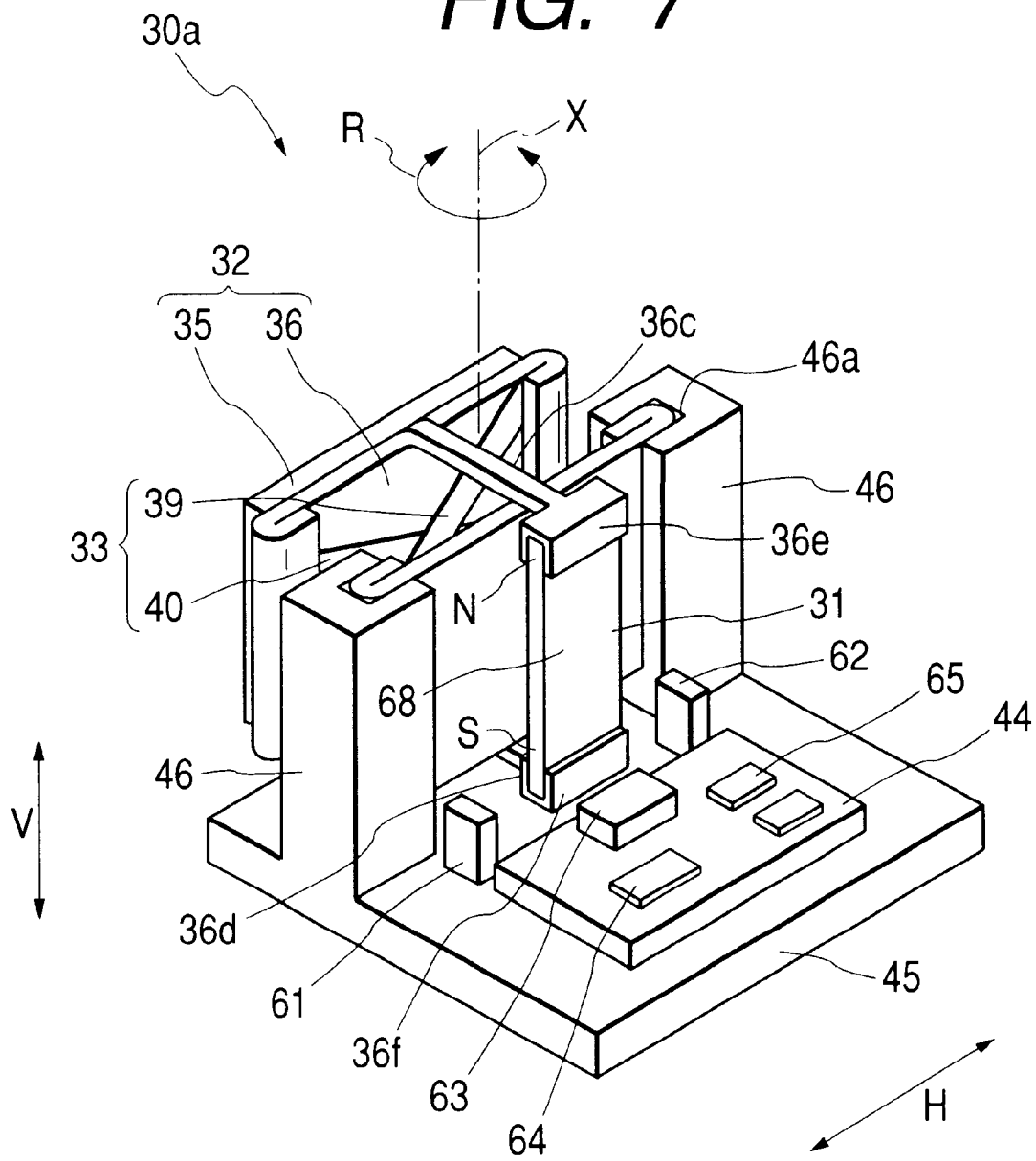
FIG. 7 is a perspective view which shows an optical scanner according to the third embodiment of the invention.

FIG. 7 shows an optical scanner 30a according to the third embodiment of the invention which is different from the second embodiment of FIGS. 5 and 6 only in a magnet mounting structure. Other arrangements are identical, and explanation thereof in detail will be omitted here.

The arms 36c and 36d of the mirror-mount 36 have ends plastically deformed to define holders 36e and 36f, respectively. The holders 36e and 36f are of C-shape in cross section and hold a permanent magnet 68 in a press fit. The permanent magnet 68 has magnetic poles oriented parallel to the axis X about which the scanning mechanism 32 swings and also works as an inertia body. In this embodiment, the N-magnetic pole is located in the upper holder 36e, while the S-magnetic pole is located in the lower holder 36f.

The base 45 has disposed thereon a pair of solenoids 61 and 62 on right and left sides of the permanent magnet 68. The circuit board 44 mounted on the base 45 has a magnetic sensor 63 made of a Hall element or a solenoid. The magnetic sensor 63 is opposed directly to the permanent magnet 68 when it is at rest. The circuit board 44 also has mounted thereon a driver IC 64 and a signal processing circuit 65. The driver IC 64 outputs drive signals to energize the solenoids 61 and 62 to oscillate the scanning mechanism 32 through the permanent magnet 68. The signal processing circuit 65 receives a signal outputted from the magnetic sensor 63 to determine the amplitude and location of the scanning mechanism 32.

In operation, when the driver IC 64 energizes the solenoid 61 to have the N-magnetic pole and the solenoid 62 to have the S-magnetic pole, respectively, it will cause the lower portion of the permanent magnet 68 (i.e., the S-magnetic pole) to be attracted to the solenoid 61, so that the scanning mechanism 32 undergoes a clockwise moment, as viewed in the drawing. Conversely, when the driver IC 64 energizes the solenoid 61 to have the S-magnetic pole and the solenoid 62 to have the N-magnetic pole, respectively, it will cause the lower portion of the permanent magnet 68 (i.e., the S-magnetic pole) to be attracted to the solenoid 62, so that the scanning mechanism 32 undergoes a counterclockwise moment, as viewed in the drawing.

Specifically, when the driver IC 64 outputs periodic drive currents in the form of a sine wave or a rectangular wave to energize the solenoids 61 and 62 to produce an alternating field, the scanning mechanism 12 swings about the axis X by the interaction between the alternating field and the magnetic field of the permanent magnet 68.

The magnetic sensor 63 is responsive to a change in strength of the magnetic field resulting from the movement of the permanent magnet 68 to provide a signal indicative thereof to the signal processing circuit 65. The signal processing circuit 65 handles the input signal to determine the amplitude and angular position of the scanning mechanism 32 and controls the drive currents supplied from the driver IC 64 to the solenoids 61 and 62 so as to bring the amplitude into a constant level. Therefore, even if the swing of the scanning mechanism 32 undergoes a small change caused by any disturbances or vibrations, the degree of the swing of the scanning mechanism 32 is kept constant by the driver IC 64 at all times, thereby ensuring the stability of the scanning operation. Further, the use of the two solenoids 61 and 62 enables a greater magnetic force to be exerted on the permanent magnet 68, thereby making it possible to eliminate an undesirable change in swing of the scanning mechanism 32 quickly which is caused by, for example, unwanted vibrations acting on the optical scanner 30a.

Instead of the magnetic sensor 63, one of the solenoids 61 and 62 may be used as a magnetic sensor. Specifically, the movement of the permanent magnet 68 causes the magnetic flux passing through the solenoids 61 and 62 to change, so that the solenoids 61 and 62 produce electromotive forces. The measurement of the amplitude and angular position of the scanning mechanism 32 may, thus, be made by monitoring the electromotive force produced by either of the solenoids 61 and 62.

Figure 8:
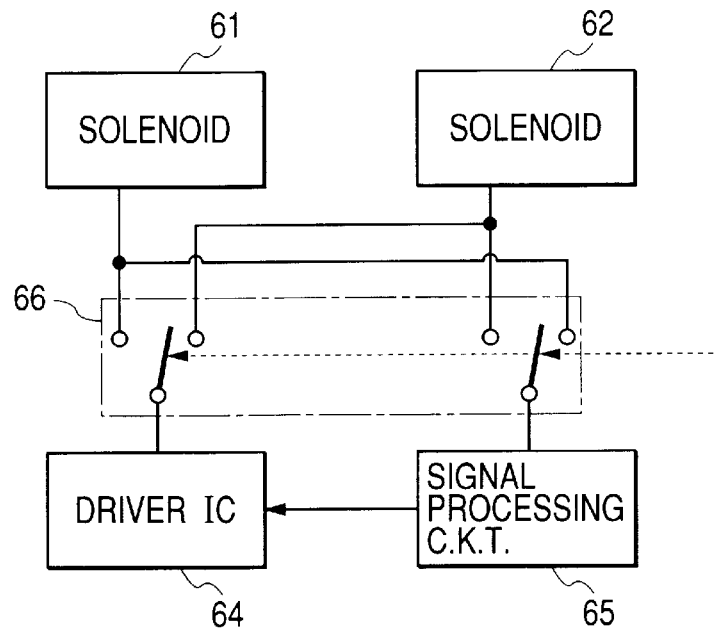
FIG. 8 is a block diagram which shows a modification of a control system of the optical scanner of FIG. 7.

A switch unit 66, as shown in FIG. 8, may also be employed which select one of the solenoids 61 and 62 as used to exert the magnetic force on the permanent magnet 68 and the other as used as the magnetic sensor alternately.

Figure 9:
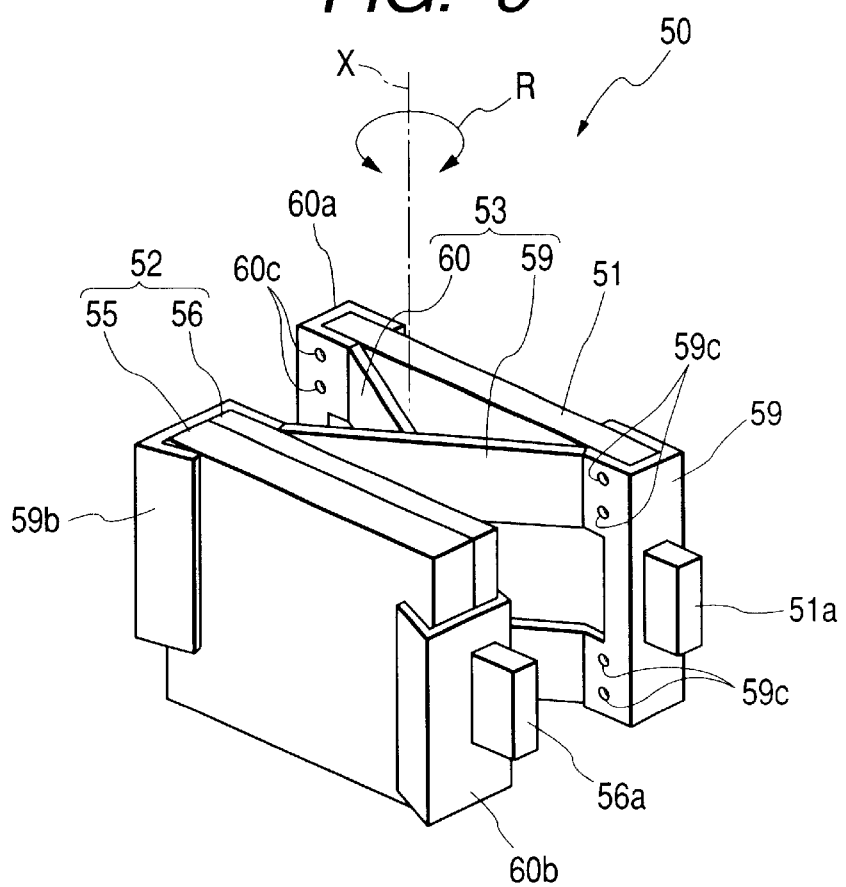
FIG. 9 is a perspective view which shows an optical scanner according to the fourth embodiment of the invention.

FIG. 9 shows an optical scanner 50 according to the fourth embodiment of the invention.

The optical scanner 50 includes a housing 51, a scanning mechanism 52, and a swing support 53. The housing 51 is made of a rectangular stainless steel plate which has protrusions 51a formed on ends thereof. The scanning mechanism 52 includes a reflecting mirror 55 identical with the reflecting mirror 15 of the first embodiment and a mirror-mount 56. The mirror-mount 56 is identical in size with the reflecting mirror 55 and has, like the housing 51, protrusions 56a formed on ends thereof. The swing support 53 includes first and second springs 59 and 60 which, similar to the above embodiments, intersect each other three-dimensionally. The first spring 59 is made of a hollow rectangular plate which has ends bent to form clips 59a and 59b each having a C-shape in cross section. The second spring 60 is made of a rectangular plate having a width smaller than that of an opening of the first spring 59 and has ends bent to form clips 60a and 60b each having a C-shape in cross section. The clips 59a, 59b, 60a, and 60b have rectangular openings into which the protrusions 51a and 56a pass respectively.

The clips 59a and 60a of the first and second springs 59 and 60 have formed in surfaces thereof facing the scanning mechanism 52 holes 59c and 60c which are fitted on bosses (not shown) formed on the housing 51 to position the first and second springs 59 and 60 relative to the housing 51. The clips 59a and 60a are fitted tightly on the ends of the housing 51 with the protrusions 51 a passing through the openings of the clips 59a and 60a.

The clips 59b and 60b, like the clips 59a and 60a, each have formed in surfaces thereof facing the housing 51 four holes (not shown) which are fitted on bosses (not shown) formed on the mirror-mount 56 to position the first and second springs 59 and 60 relative to the mirror-mount 56. The clips 59b and 60b are fitted tightly on ends of the reflecting mirror 55 and the mirror-mount 56 with the protrusions 56a passing through the openings of the clips 59b and 60b. The reflecting mirror 55 and the mirror-mount 56 are laid to overlap each other and nipped in the clips 59b and 60b without use of adhesive.

The first and second springs 59 and 60 have piezoelectric devices (not shown) bonded to spring portions thereof. The voltage is applied to the piezoelectric devices alternately to induce expansion and contraction of the first and second springs 59 and 60 cyclically, thereby swinging the scanning mechanism 52 about the axis X passing near or through an intersection of the first and second springs 59 and 60. This causes a light beam incident to the reflecting mirror 55 to scan a plane one-dimensionally which extends perpendicular to the axis X.

The scan velocity of the light beam emitted from the reflecting mirror 55 is controlled by a cycle of the swing of the scanning mechanism 52, that is, an on-off cycle of a voltage signal applied to each of the piezoelectric devices mounted on the first and second springs 59 and 60. The scan range of the light beam is controlled by the degree of the swing of the scanning mechanism 52, that is, the amount of current supplied to each of the piezoelectric devices.

The frequency of the voltage signal applied to each of the piezoelectric devices may be set equal to the resonance frequency which is determined by the moment of inertia of the scanning mechanism 52 and the spring constants of the first and second springs 59 and 60 to swing the scanning mechanism 12, like the above embodiments, with a decreased consumption of power.

Other arrangements are identical with those of the first embodiment, and explanation thereof in detail will be omitted here. FIG. 10(a) shows an optical scanner 70 according to the fifth embodiment of the invention.

The optical scanner 70 includes a housing 71, a scanning mechanism 72, and a swing support 73.

The scanning mechanism 72 is made of a thick-walled rectangular plate which has formed on corners thereof flanges 72a, 72b, 72c, and 72d for installing springs 73a, 73b, 73c, and 74d as will be described later in detail. The scanning mechanism 72 has a reflecting mirror 75 formed by mirror-finishing or depositing aluminum on a major surface thereof (will be referred to as a front surface below) and a permanent magnet (not shown) attached to a rear surface thereof. The permanent magnet has N- and S-magnetic poles arrayed in a direction H perpendicular to the axis X about which the scanning mechanism 72 swings.

The housing 71 is made of a plate having formed therein an opening which is large enough to allow the scanning mechanism 72 to swing without hitting on the housing 71.

The swing support 73 is made up of four springs 73a, 73b, 73c, and 73d each made of a strip member. Each of the springs 73a to 73d is attached at one end to one of the flanges 72a to 72d of the scanning mechanism 72 and at the other end to the rear surface of the housing 71. The attachment of the springs 73a to 73d may be achieved by staking or using screws or adhesive. The spring 73a intersects the spring 73b at a vertical offset. Similarly, the spring 73c intersects the spring 73d at a vertical offset.

The springs 73a to 73d are so arranged that a line extending through the intersections of the springs 73a to 73d passes through the center of gravity of the scanning mechanism 72 (including the permanent magnet disposed on the rear surface), thereby minimizing the moment of force disturbing the scanning operation of the scanning mechanism 72 caused by, for example, undergoing quick acceleration. Specifically, while the center of gravity of the scanning mechanism in each of the above embodiments is defined near or on the axis X about which the scanning mechanism swings by adding the inertia body to the scanning mechanism, this embodiment achieves it by constructing the swing support 73 so that the line extending through the intersections of the springs 73a to 73d passes through the center of gravity of the scanning mechanism 72.

Each of the springs 73a to 73d has the width oriented in a vertical direction V parallel to the axis X about which the scanning mechanism 72 swings, thereby resulting in an increase in rigidity of the swing support 73 resisting unwanted vertical vibrations acting on the optical scanner 70.

The swing of the scanning mechanism 72 is accomplished in the same manner as that of the first embodiment. Specifically, a solenoid (not shown) is disposed at a given interval away from the permanent magnet mounted on the rear surface of the scanning mechanism 72. The voltage signal is applied to the solenoid to produce the alternating field, thereby inducing the scanning mechanism to swing about the axis X.

The housing 7, as already described, has the opening. The fine adjustment of the center of gravity of the scanning mechanism 72 to a desired position may, thus, be accomplished easily by trimming the rear wall of the scanning mechanism 72 through the opening of the housing 71.

Figure 10B:
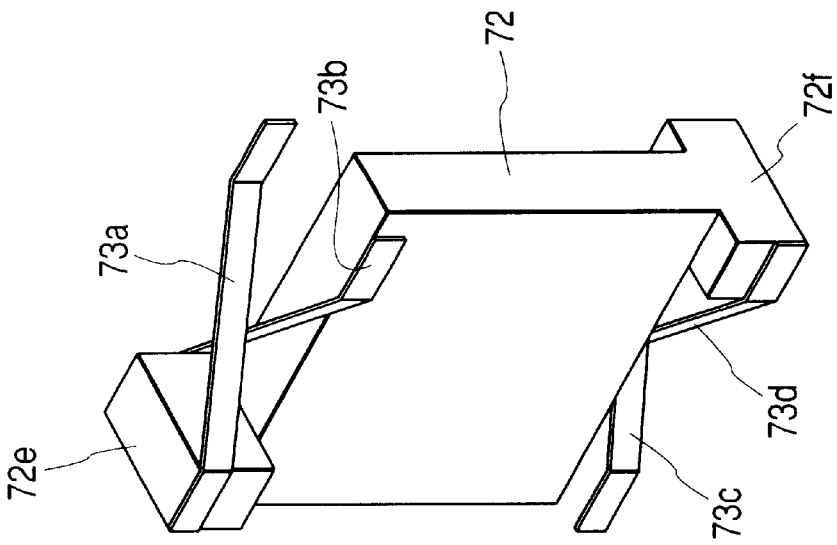
FIG. 10(b) is a perspective view which shows a modification of a swing support of FIG. 10(a)
Figure 10A:
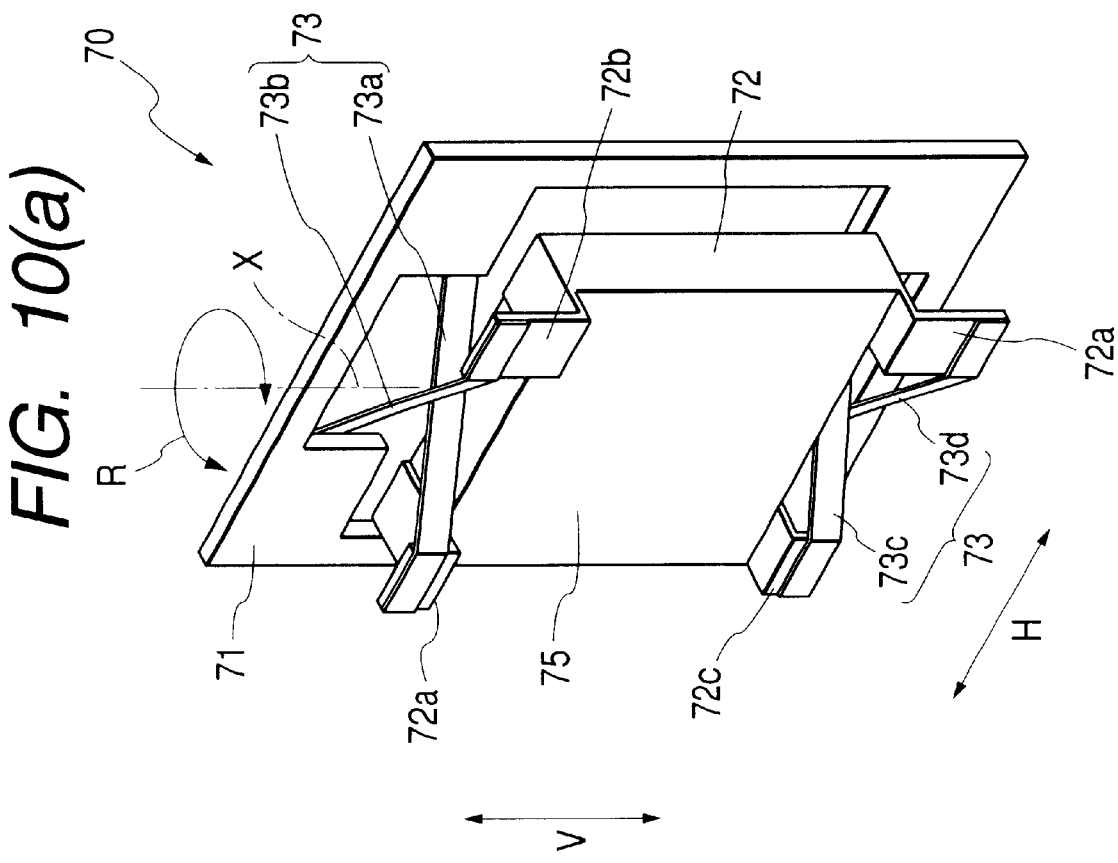
FIG. 10(a) is a perspective view which shows an optical scanner according to the fifth embodiment of the invention.

Instead of the flanges 73a to 73d formed on the scanning mechanism 72, flanges 72e and 72f, as shown in FIG. 10(b), may be provided on diagonally opposed corners of the scanning mechanism 72 for retaining ends of the springs 73a to 73d, respectively, in an illustrated manner. The other end of each of the springs 73a to 73d is attached to the housing 71.

Figure 11B:
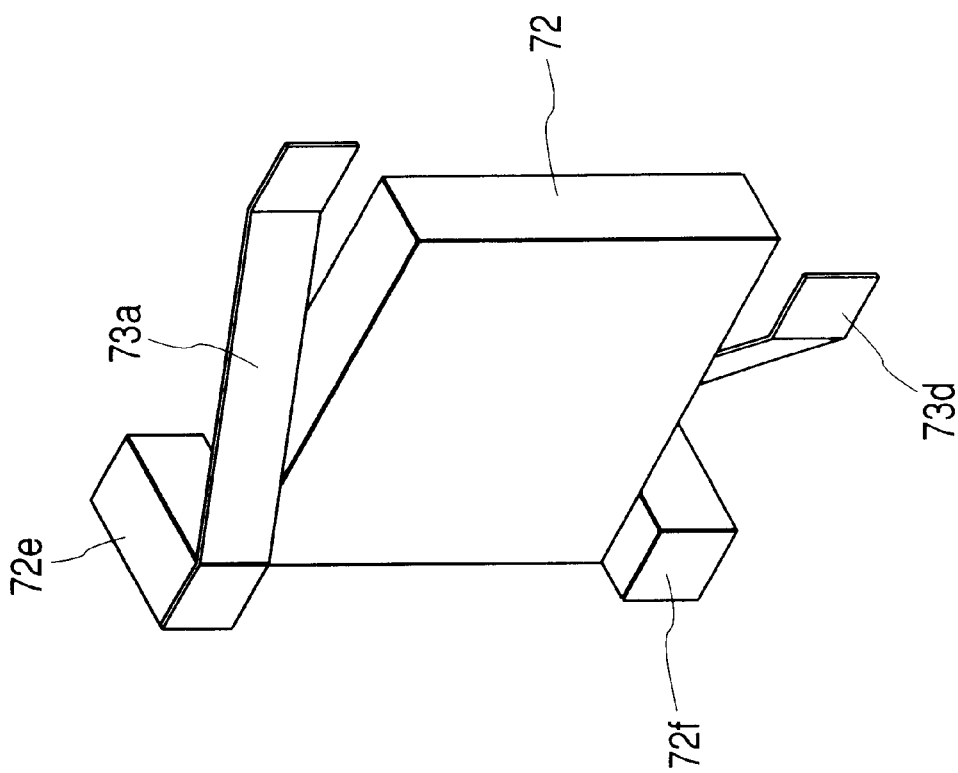
FIGS. 11(a) and 11(b) are reperspective views which show modifications of a swing support designed to support a swing of a scanning mechanism in the fifth embodiment.
Figure 11A:
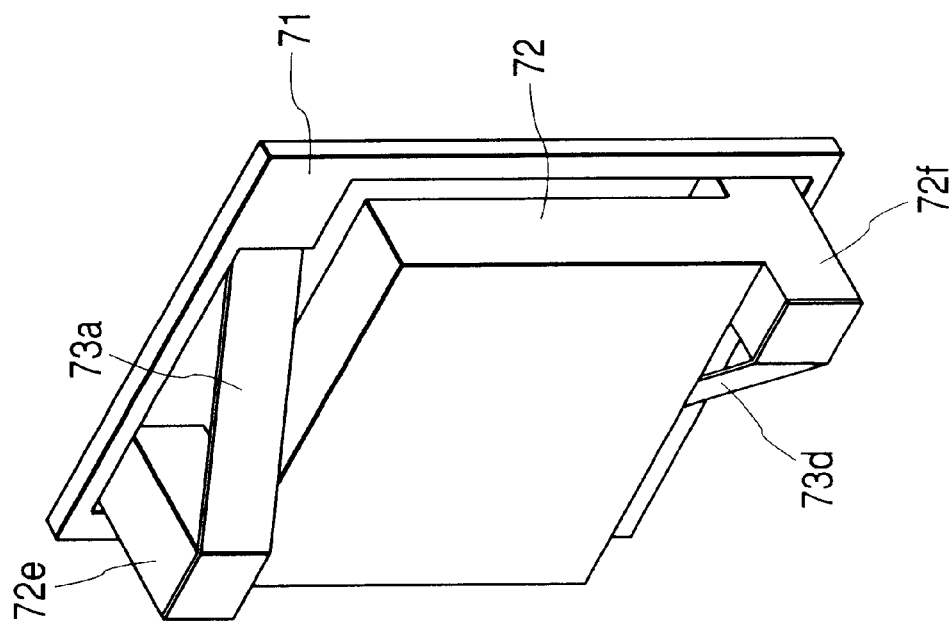

The springs 73b and 73c of FIG. 10(b) may be omitted, as shown in FIG. 11(a). Moreover, the flanges 72e and 72f of FIG. 11(a) may alternatively be formed, as shown in FIG. 11(b), on the corners of the scanning mechanism 72 on the same side.

In the above first to fourth embodiments, a light source may alternatively be installed in the scanning mechanism without use of the reflecting mirror to emit a light beam directly from the scanning mechanism.

The piezoelectric devices of the third embodiment may be used in the above first, second, and fourth embodiments instead of the solenoid and the permanent magnet. Further, the frequency of swing of the scanning mechanism is not always equal to the resonance frequency of the scanning mechanism. For example, a triangular wave signal having a frequency lower than the resonance frequency may be applied to the solenoid to swing the scanning mechanism at a constant speed.

The optical scanners 10, 30, 50, and 70 in the first to fifth embodiments are, as described above, each designed to scan a light beam one-dimensionally. Two optical scanners of such types may be used to construct a two-dimensional scanning device as discussed below.

Figure 12:
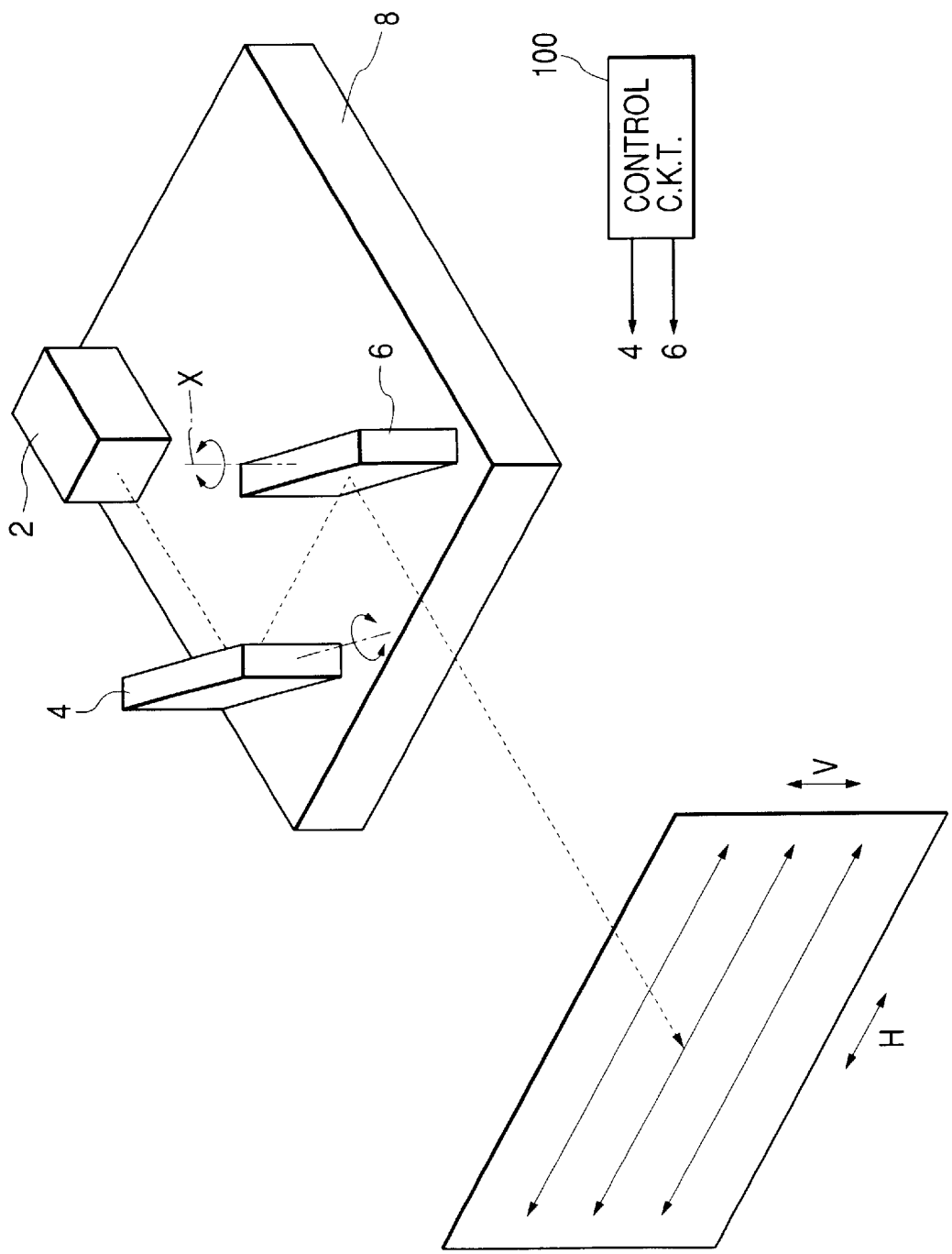
FIG. 12 is a perspective view which shows a two-dimensional scanning device using a combination of optical scanners in the first to fifth embodiments.

FIG. 12 shows a two-dimensional scanning device which includes a light source 2, a vertical scanner 4, a horizontal scanner 6, a base 8, and a controller 100. The base 8 is made of a resinous or metallic plate and fixes the light source 2 and the scanners 4 and 6 thereon. The controller 100 may be mounted on or at a distance from the base 8. In the following discussion, a direction parallel to the upper surface of the base 8 on which the light source 2 and the scanners 4 and 6 are mounted will be referred to as a horizontal direction H, and a direction perpendicular to the upper surface of the base 8 will be referred to as a vertical direction V The light source 2 is made of up a semiconductor laser and a collimating lens and emits a collimated laser beam. The vertical scanner 4 is made of any one of the optical scanners 10, 30, 50, and 70 in the above embodiments and designed to be swingable within a vertical range of ±1°. Similarly, the horizontal scanner 6 is made of any one of the optical scanners 10, 30, 50, and 70 in the above embodiments and designed to be swingable within a given horizontal range to reflect the laser beam emitted from the vertical scanner 4 to a frontal scan zone.

In operation, the controller 100 swings the vertical scanner 4 vertically to hold it at a given angular position to direct the laser beam from the light source 2 to the horizontal scanner 6. The controller 100 simultaneously swings the horizontal scanner 6 in the horizontal direction H to reflect the laser beam from the vertical scanner 4 frontward to scan a horizontal line one-dimensionally. Next, the controller 100 inclines the vertical scanner 4 further and holds it, thereby causing the laser beam emitted from the horizontal scanner 6 to scan a line shifted vertically from the first horizontal line. These operations are repeated to scan a desired zone two-dimensionally.

If the base 8 is inclined accidentally for some reasons, so that the laser beam is shifted vertically from a desired angular position, the controller 100 may move the vertical scanner 4 so as to bring the laser beam into agreement with the desired angular position. For example, an obstacle detector mounted in an automotive vehicle is usually designed to scan a zone defined on a road surface a given distance ahead of the vehicle to detect obstacles present in front of the vehicle. Therefore, if heavy baggage is loaded in a rear trunk, it may cause the front of the vehicle to be lifted up, so that a laser beam emitted from the vehicle is shifted vertically out of the scan zone. Moreover, if the road surface is irregular, it may also cause the laser beam to be shifted vertically out of the scan zone. In such a case, the controller 100 may adjust a vertical angle of the vertical scanner 4 to radiate the laser beam to a desired angular position within the scan zone.

Figure 13:
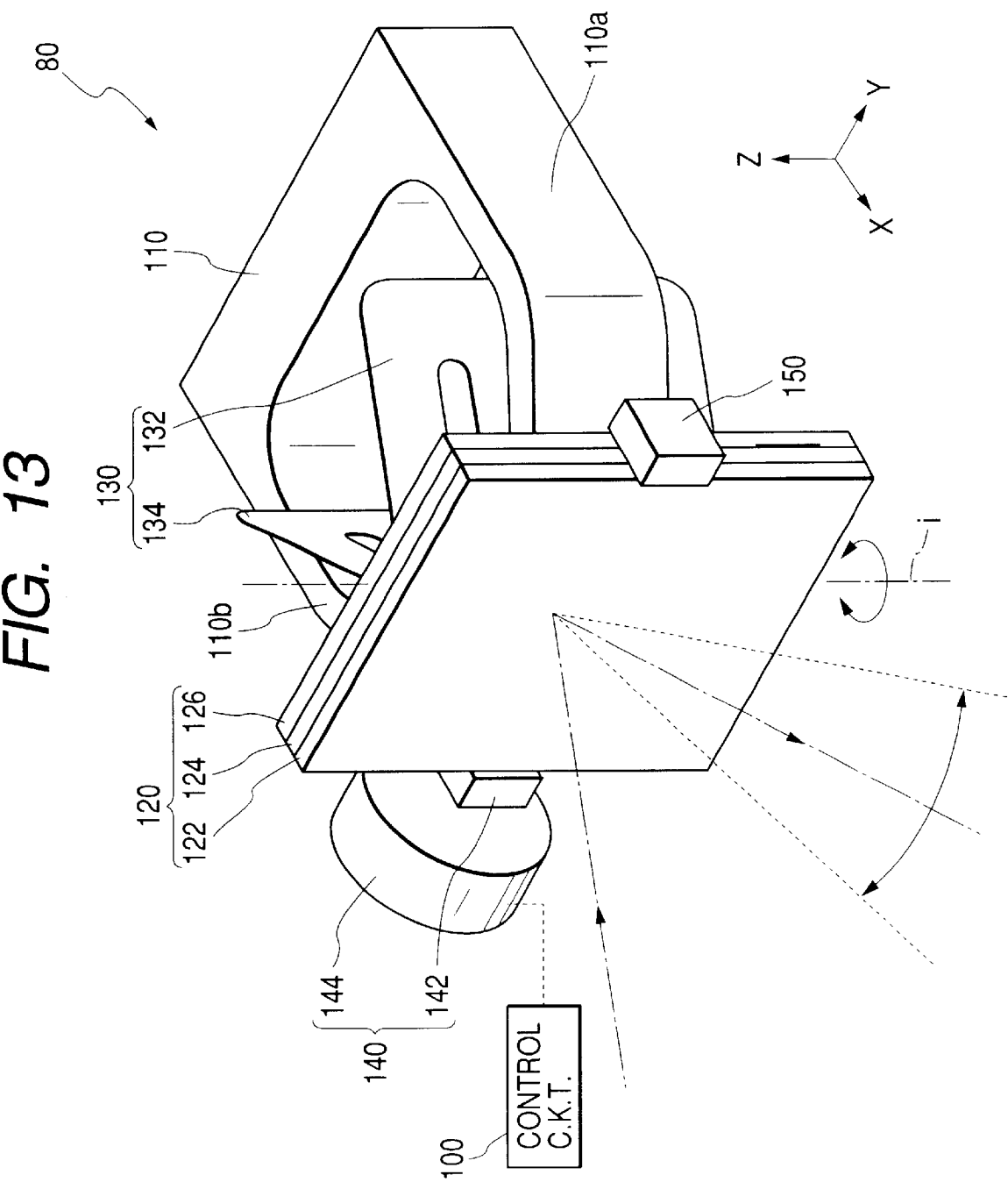
FIG. 13 is a perspective view which shows an optical scanner according to the sixth embodiment of the invention.
Figure 14:
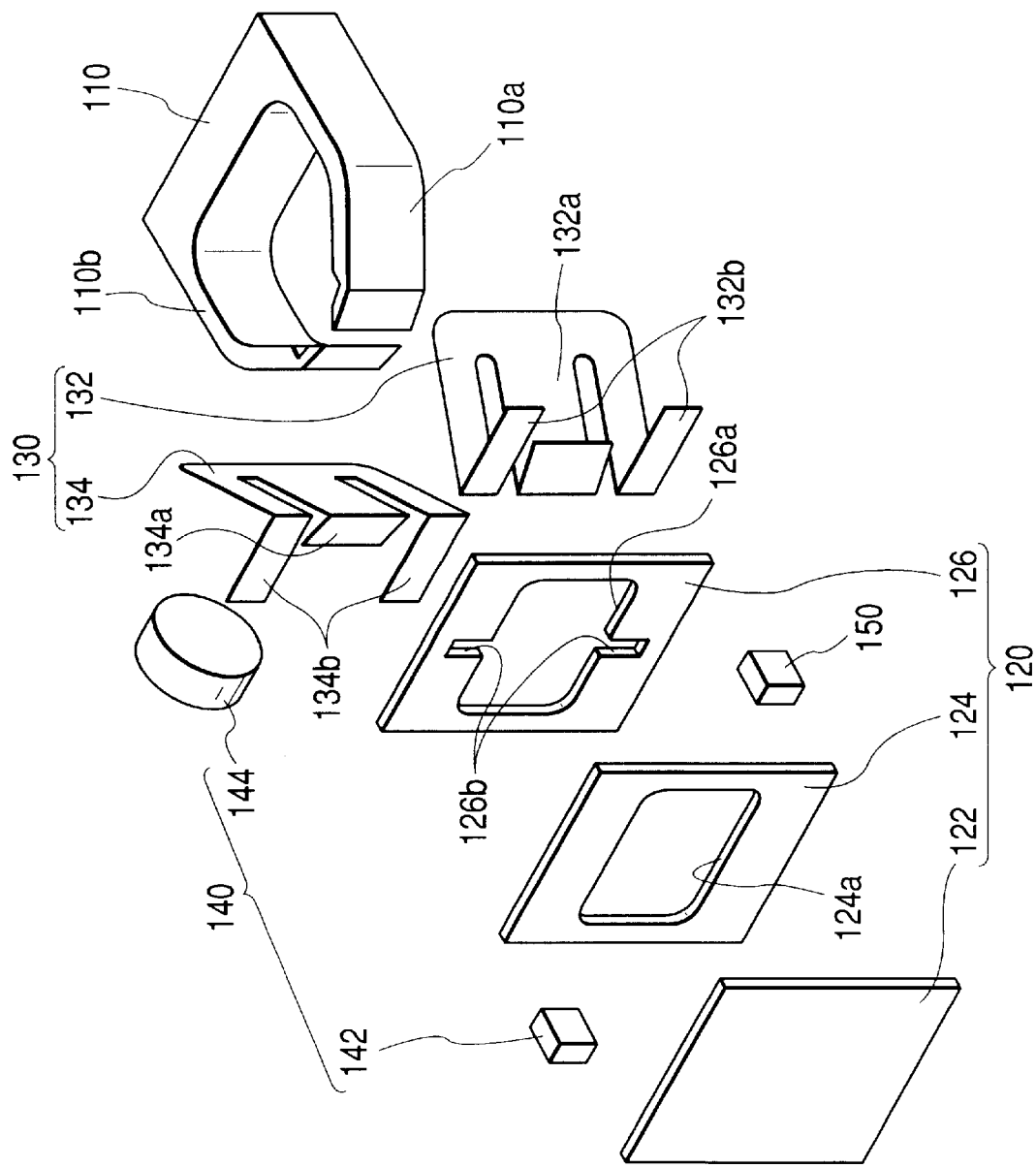
FIG. 14 is an exploded view of FIG. 13.

FIGS. 13 and 14 show an optical scanner 80 according to the sixth embodiment of the invention.

The optical scanner 80 includes a housing 110, a scanning mechanism 120, a swing support 130, and a driver 140.

The housing 1110 is installed on a chassis of, for example, a bar code reader or an automotive obstacle detector and, as clearly shown in FIG. 14, made of a C-shaped metallic member which is machined to have a pair of arms 110a and 110b curved inwardly.

The scanning mechanism 120 is made up of a reflecting mirror 122, a spacer 124, and a mirror-mount 126. The reflecting mirror 122 is attached to the mirror-mount 126 through the spacer 124. The mirror-mount 126 is retained by the swing support 130. The scanning mechanism 120 also has a permanent magnet 142 and an inertia body 150 mounted on sides thereof. The inertia body 150 is identical in mass with the permanent magnet 142.

The spacer 124 and the mirror-mount 126 are each made of a 0.5 mm-thick metallic plate machined to a rectangular shape and have rectangular openings 124a and 126a, respectively. The mirror-mount 126 has a pair of cut-out portions 126b formed in upper and lower portions across the opening 126a. The reflecting mirror 122 is made of a glass plate having a thickness of approximately 0.2 mm on which aluminum is deposited.

Figure 15:
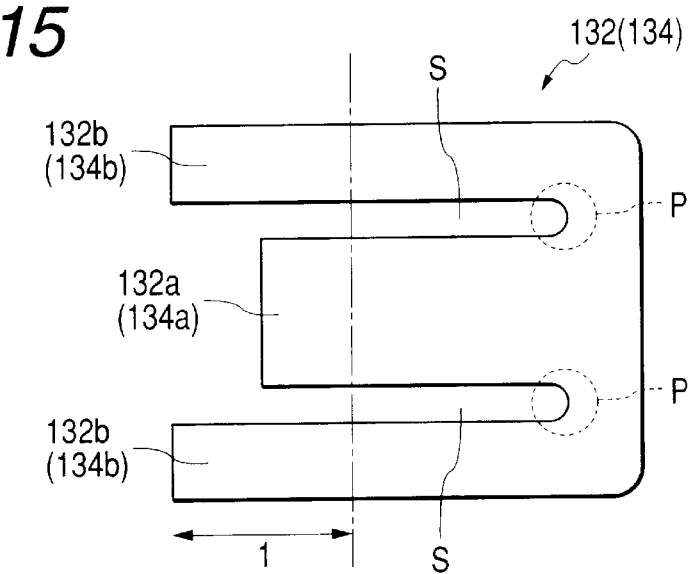
FIG. 15 is a plan e view which shows a structure of each spring working to support a swing of a scanning mechanism.

The swing support 130 is made up of first and second springs 132 and 134. The first spring 132 is, as shown in FIG. 15, made of a stainless steel plate having a thickness of approximately 0.05 mm which is machined to an E-shape by etching or punching to define a housing-attachment strip 132a and a pair of scanning mechanism-attachment strips 132b. The second spring 134 is, like the first spring 132, made of an E-shaped stainless steel plate which is made up of a housing-attachment strip 134a and a pair of scanning mechanism-attachment strips 134b. The strips 132a, 132b, 134a, and 134b are bent outward at a broken line, as shown in FIG. 15, defined a given distance l away from ends thereof. The bent angle of the housing-attachment strips 132a and 134a is 75° The bent angle of the scanning mechanism-attachment strips 132b and 134b is 60°. Slits S between the housing-attachment strip 132a (134a) and the scanning mechanism-attachment strips 132b (134b) are rounded at ends as indicated by p in FIG. 15, thereby avoiding the concentration of stress arising from the swing of the scanning mechanism 120.

The first and second springs 132 and 134 may alternatively be made of beryllium copper, phosphor bronze, or spring steel.

The width of the first and second springs 132 and 134 in the z-axis direction of FIG. 13 is so selected that the first and second springs 132 and 134 pass through the cut-out portions 126b of the mirror-mount 126. The width of the housing-attachment strips 132a and 134a in the z-axis direction is so selected that the housing-attachment strips 132a and 134a pass through the openings 126a and 124a of the mirror-mount 126 and the spacer 124 without any contact.

The joining of the housing 110 and the scanning mechanism 120 is accomplished in the following manner.

First, the first and second springs 132 and 134 are joined to the mirror-mount 126. Specifically, the bent portions of the scanning mechanism-attachment strips 132b of the first spring 132 are passed through the cut-out portions 126b of the mirror-mount 126 and, as clearly shown in FIG. 16, welded to the right side of a surface of the mirror-mount 126 facing the spacer 124. Similarly, the bent portions of the scanning mechanism-attachment strips 134b of the second spring 134 are passed through the cut-out portions 126b of the mirror-mount 126 and welded to the left side of the surface of the mirror-mount 126 facing the spacer 124. The ridges of the strips 132a, 132b, 134a and 134b are placed close to or in contact with each other.

Figure 16:
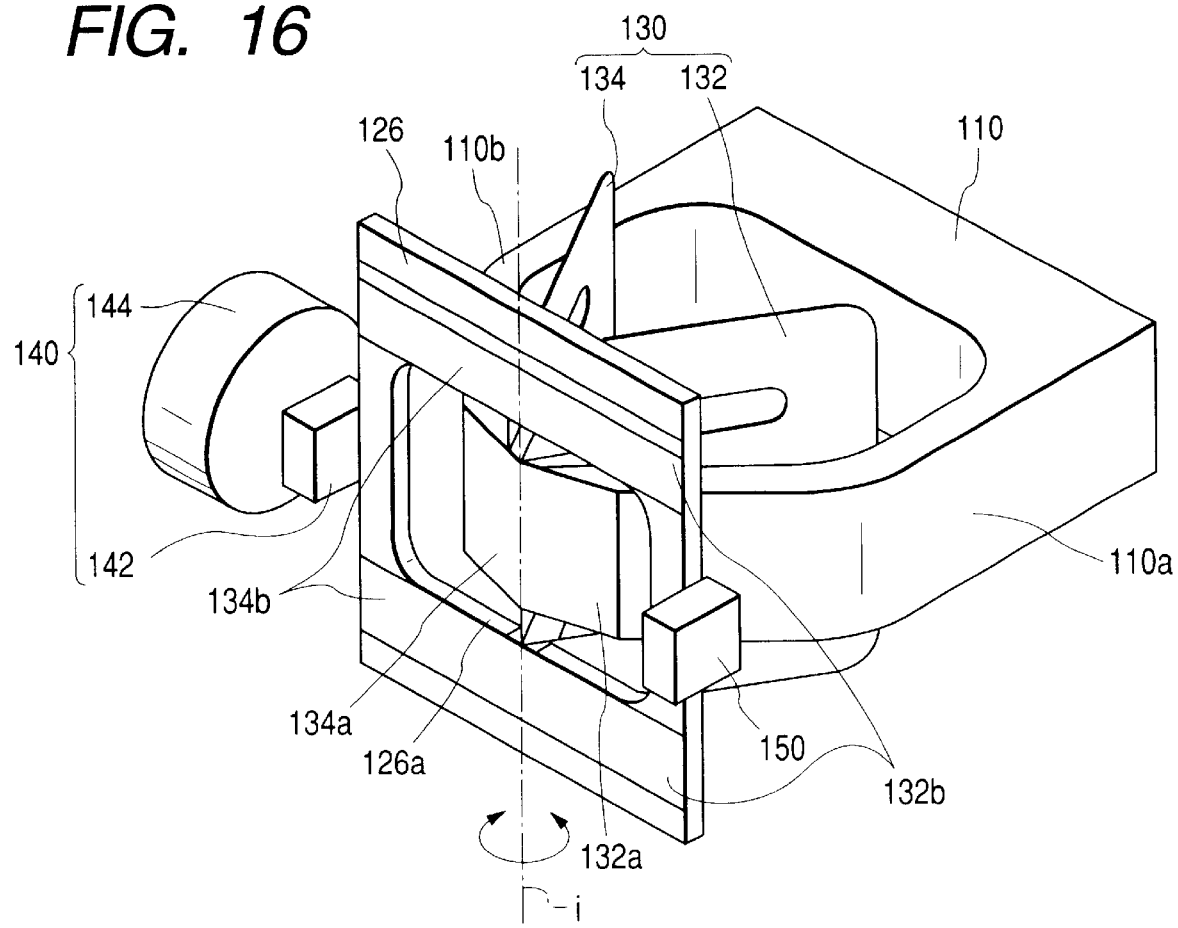
FIG. 16 is a perspective view which shows a structure of a connection of a housing and a scanning mechanism through a swing support.

Next, the first and second springs 132 and 134 welded to the mirror-mount 126 are placed, as shown in FIG. 16, inside the housing 10. The bent portions of the housing-attachment strips 132b and 134b of the first and second springs 132 and 134 are welded to outer walls of the tips of the arms 110a and 110b of the housing 110, thereby joining the mirror-mount 126 to the housing 110 so that the mirror-mount 126 can swing horizontally about a line i passing through a contact line between the ridges of the housing-attachment strips 132a and 134a.

Finally, the spacer 124 and the reflecting mirror 122 are attached to the mirror-mount 126.

The line i lies flush with the surface of the mirror-mount 126 facing the spacer 124, but the opening 124a of the spacer 124 avoids a hit of the housing-attachment strips 132a and 134a of the first and second springs 132 and 134 on the reflecting mirror 122 during the swing of the scanning mechanism 120.

The permanent magnet 142 and the inertia body 150 are so attached to the sides of the scanning mechanism 120 that the center of gravity of the scanning mechanism 120 lies on the line i about which the scanning mechanism 120 swings. The fine adjustment of a location of the center of gravity of the scanning mechanism 120 may be achieved by forming threaded holes in the permanent magnet 142 and/or the inertia body 150 and adjusting an amount by which screws are inserted into the threaded holes.

The driver 140 consists of the permanent magnet 142 attached to the side of the scanning mechanism 120, the solenoid 144 mounted, for example, on a chassis (not shown), and a solenoid control circuit 100.

The permanent magnet 142 has magnetic poles arrayed in the x axis direction perpendicular to the reflecting surface of the reflecting mirror 122. In a case where the S-magnetic pole of the permanent magnet 142 is provided on the side of the reflecting surface of the reflecting mirror 122, and the N-magnetic pole thereof is provided on the side of the back surface of the mirror-mount 126, when the control circuit 100 energizes the solenoid 144 so as to produce the N-magnetic pole on a surface of the solenoid 144 facing the permanent magnet 142, it will cause the S-magnetic pole of the permanent magnet 18 provided on the side of the reflecting surface of the reflecting mirror 122 to be attracted to the solenoid 144, so that the scanning mechanism 120 undergoes a moment of force in clockwise direction, as viewed in FIG. 13. Conversely, when the control circuit 100 energizes the solenoid 144 so as to produce the S-magnetic pole, it will cause the N-magnetic pole of the permanent magnet 142 provided on the side of the back surface of the mirror-mount 126 to be attracted to the solenoid 144, so that the scanning mechanism 120 undergoes a moment of force in counterclockwise direction, as viewed in FIG. 13. Specifically, when the solenoid control circuit 100 outputs a periodic drive signal in the form of a sine wave or a rectangular wave to energize the solenoid 144, the solenoid 144 will produce an alternating field, so that the scanning mechanism 120 swings about the line i by the interaction between the alternating field and the magnetic field of the permanent magnet 142. This causes a light beam incident on the reflecting mirror 122 to scan in the y axis direction one-dimensionally. The velocity of scan of the light beam may be controlled by changing the cycle of the swing of the scanning mechanism 120, that is, the frequency of the drive signal applied to the solenoid 144. The scan range of the light beam may be modified by changing the degree of the swing of the scanning mechanism 120, that is, the amplitude of the drive signal (i.e., the voltage level) applied to the solenoid 144. In this embodiment, the frequency of the drive signal outputted by the control circuit 100 is set identical with the resonance frequency which is determined by the moment of inertia of the scanning mechanism 120 and the spring constants of the first and second springs 132 and 134 so that the scanning mechanism 120 may swing at the resonance frequency.

If an excessive drive signal is applied to the solenoid 144 so that the amplitude of the swing of the scanning mechanism 120 exceeds a desired level, the mirror-mount 126 hits on the arms 110a and 110b of the housing 110, thereby delimiting the range of the swing of the scanning mechanism 120.

As apparent from the above discussion, the swing support 130 which retains the scanning mechanism 120 to be swingable horizontally has the structure in which the ridges defined by the bends of the first and second springs 132 and 134 are arrayed along the line i about which the scanning mechanism 120 swings. Specifically, each of the first and second springs 132 and 134 is lower in rigidity resistant to deformation in a direction of the swing of the scanning mechanism 120, but higher in rigidity resistant to deformation in other directions, especially the z-axis direction parallel to the line i about which the scanning mechanism 120 swings.

Further, the center of gravity of the scanning mechanism 120 is defined near or on the line i about which the scanning mechanism 120 swings, thereby minimizing the moment of force disturbing the scanning operation of the scanning mechanism 120.

Specifically, even if the optical scanner 80 undergoes any acceleration disturbing the scanning operation, the swing support 130 works to minimize the moment of force inducing unwanted vibrations of the scanning mechanism 120. Therefore, in a case where the optical scanner 80 is mounted in an automotive vehicle, the scanning mechanism 120 scans a desired range precisely.

The scanning mechanism 120 supported by the first and second springs 132 and 134 is not subjected to any friction during a swing, thus resulting in an increase in durability of the scanning mechanism 120. Moreover, the arms 110a and 110b of the housing 110 serves to avoid excessive movement of the scanning mechanism 120, thus avoiding undesirable deformation or breakage of the swing support 130 (i.e., the first and second springs 132 and 134).

The use of a simple structure of the driver 140 made up of the permanent magnet 142, the solenoid 144, and the control circuit 100 results in a decrease in overall manufacturing costs of the optical scanner 80. The scanning mechanism 120 is designed to swing at the resonance frequency thereof, thereby enabling a greater degree of swing to be achieved with a small driving force, thus resulting in a decrease in consumption of power in the driver 140.

Figure 17:
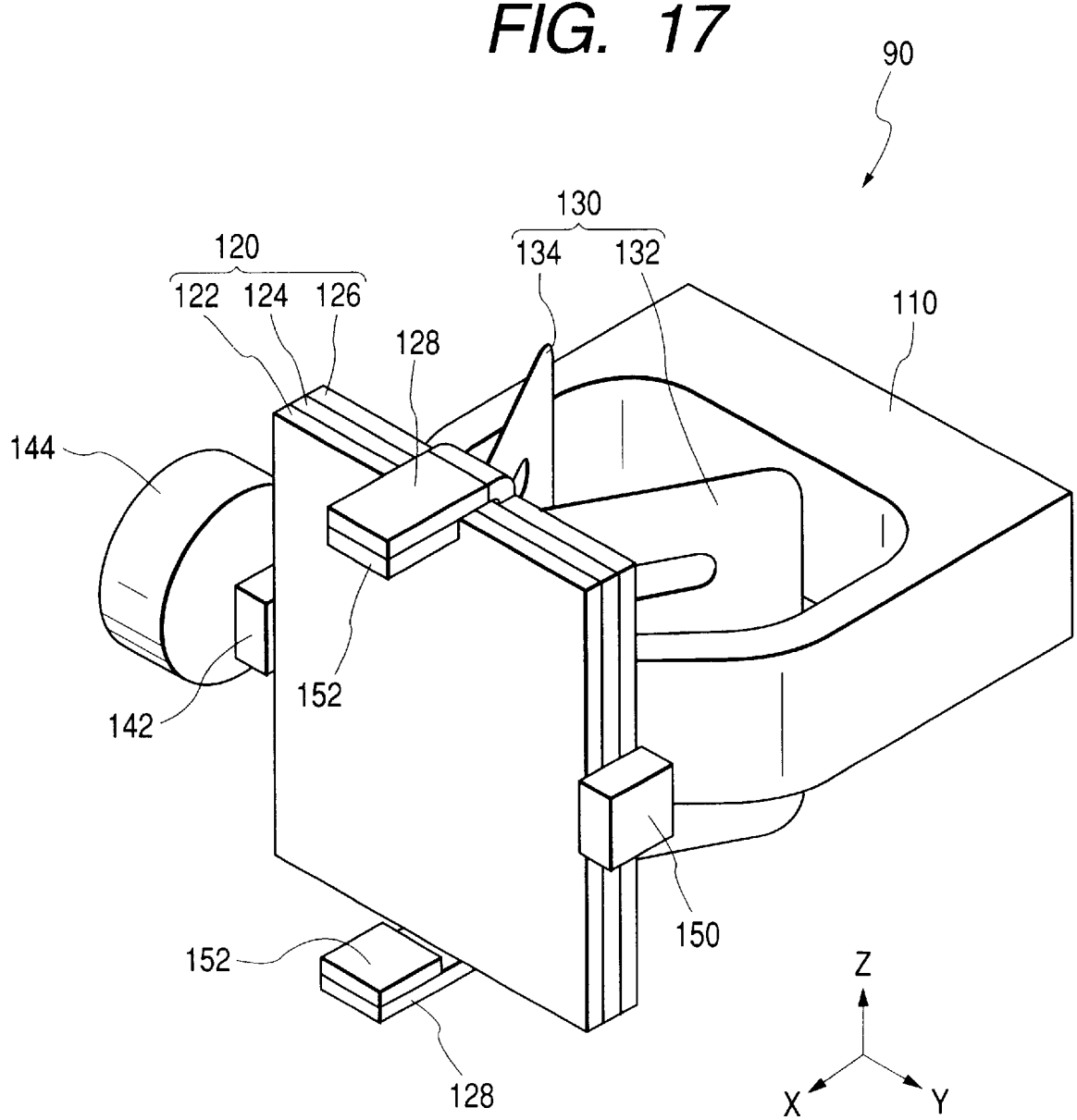
FIG. 17 is a perspective view which shows an optical scanner according to the seventh embodiment of the invention.

FIG. 17 shows an optical scanner 90 according to the seventh embodiment of the invention which is different from the one in the sixth embodiment only in that the mirror-mount 126 has arms 128 extending from upper and lower ends thereof ahead of the reflecting mirror 122 to carry inertia bodies 152 for adjustment of the center of gravity of the scanning mechanism 120 in a direction perpendicular to the reflecting surface of the reflecting mirror 122 (i.e., the x-axis direction). Other arrangements are identical, and explanation thereof in detail will be omitted here.

The adjustment of the center of gravity of the scanning mechanism 120 may also be achieved by changing the size or mounted location of the permanent magnet 142 and/or the inertia body 150, but the installation of the inertia bodies 152 using the arms 128 in this embodiment enables a precise adjustment of the center of gravity of the scanning mechanism 120 even if it is shifted greatly from a desired location.

As an alternative to use of the inertia bodies 152, the permanent magnet 142 and the solenoid 144 may be installed on the arms 128, respectively.

The arms 128 may alternatively be provided behind the mirror-mount 126 as needed.

A light source may be installed in the scanning mechanism 120 without use of the reflecting mirror 122 to emit a light beam directly from the scanning mechanism 120.

Figure 18:
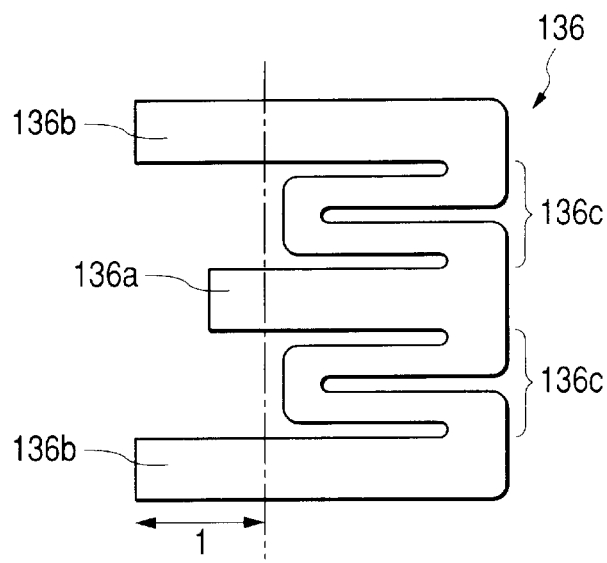
FIG. 18 is a plane view which shows a structure of each spring working to support a swing of a scanning mechanism.

Each of the first and second springs 132 and 134 in the sixth and seventh embodiments may be made of a spring plate 136 as shown in FIG. 18 in which a housing-attachment strip 136a is connected to scanning mechanism-attachment strips 136b through C-shaped plates 136c in order to increase an elastically deformable area between the scanning mechanism-attachment strips 136b during a swing of the scanning mechanism 120. The increase in elastically deformable area allows the spring constant to be decreased, thus allowing the resonance frequency of the swing of the scanning mechanism 120 to be lowered. It is, thus, possible to decrease the scan velocity of a light beam as needed without increasing the size of the swing support 130.

Figure 19A:
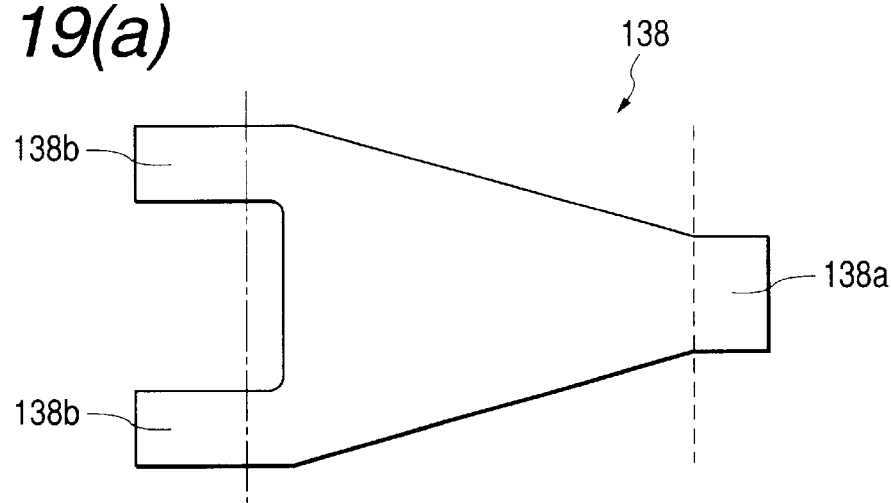
FIG. 19(a) is a plane view which shows a modification of each spring making up a swing support.
Figure 19B:
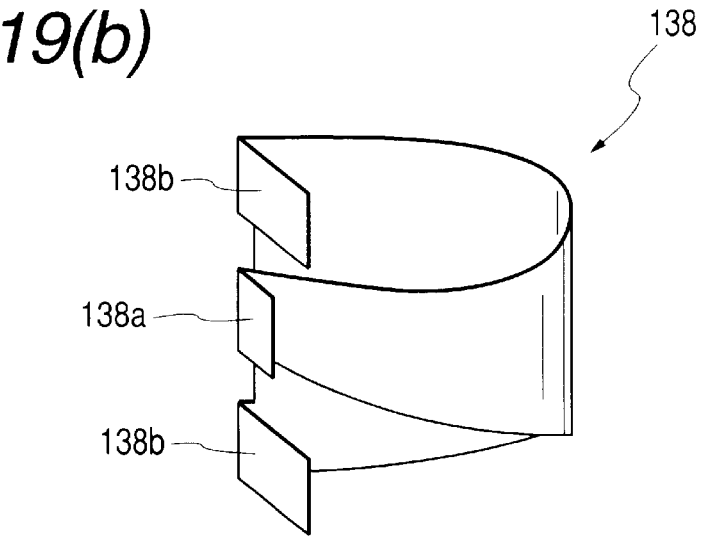
FIG. 19(b) is a perspective view which shows the spring of FIG. 19(a) curved for installation of a housing and a scanning mechanism.

Each of the first and second springs 132 and 134 may also be made of a spring 138 as shown in FIGS. 19(a) and 19(b).

The spring 138 is formed by bending a Y-shaped plate, as shown in FIG. 19(a) having a housing-attachment strip 138a and a pair of scanning mechanism-attachment strips 138b extending opposite the strip 138a along broken lines and curving it, as shown in FIG. 7(b), so as to array ridges of the strips 138a and 138b in alignment with each other. The spring 138 has, like the one shown in FIG. 18, an increased elastically deformable area between the scanning mechanism-attachment strips 138b, thus allowing the san velocity of a light beam to be decreased as needed without increasing the size of the swing support 130.

Figure 20A:
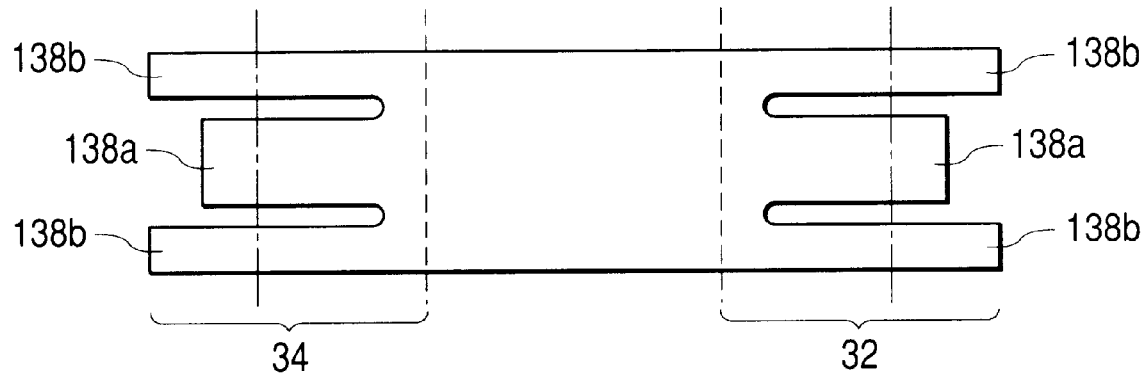
FIG. 20(a) is a plane view which shows another modification of each spring making up a swing support.
Figure 20B:
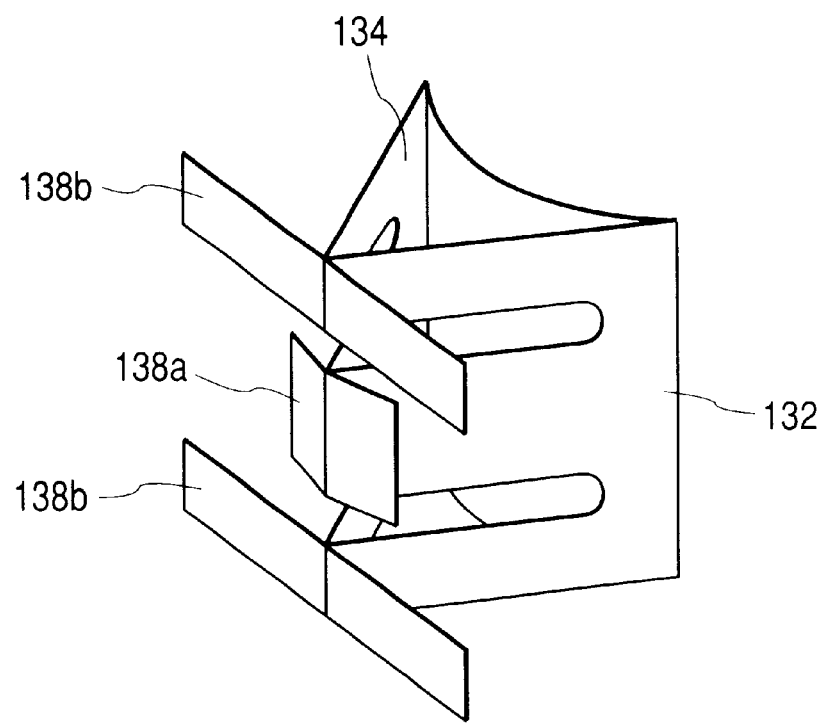
FIG. 20(b) is a perspective view which shows the spring of FIG. 20(a) curved for installation of a housing and a scanning mechanism.

Further, the first and second springs 132 and 134 may also be made by bending a one-piece plate, as shown in FIG. 20(a), along broken lines so as to array ridges of the strips 138a and 138b, as shown in FIG. 20(b), in alignment with each other. It is advisable that a connection of the first and second springs 132 and 134 be curved, as clearly shown in FIG. 20(b), for facilitating ease of elastic deformation of the springs 132 and 134 during a swing of the scanning mechanism 120.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An optical scanner comprising:

a housing including a pair of arms extending in the same direction;

a scanning mechanism constructed to be swingable about a given swing line to emit a light beam for scanning a given angular range;

a support supporting said scanning mechanism on said housing so as to allow said scanning mechanism to swing, said support including a pair of elastic plates surrounded by the arms of said housing, each of the elastic plates having a housing-attachment strip and a scanning mechanism-attachment strip, the housing-attachment strip having a bent end attached to an end of one of the arms of said housing, the scanning mechanism-attachment strip having a bent end attached to said scanning mechanism, the elastic plates being arranged adjacent each other so that ridges defined by bends of the ends of the housing-attachment strips and the scanning mechanism-attachment strips are arrayed along a line; and a driver swinging said scanning mechanism about the line along which the ridges of the housing-attachment strips and the scanning mechanism-attachment strips are arrayed for directing the light beam to the given angular range.

2. An optical scanner as set forth in claim 1, wherein said scanning mechanism has a reflecting surface for reflecting the light beam emitted from a light source toward the given angular range.

3. An optical scanner as set forth in claim 1, wherein the center of gravity of said scanning mechanism is defined on the line along which the ridges of the housing-attachment strips and the scanning mechanism-attachment strips are arrayed.

4. An optical scanner as set forth in claim 1, wherein said driver swings said scanning mechanism at a resonance frequency determined by mass of said scanning mechanism and spring constants of the elastic plates.

5. An optical scanner as set forth in claim 1, wherein said driver includes a permanent magnet mounted on said scanning mechanism and a solenoid disposed opposite the permanent magnet, when energized, the solenoid producing an alternating field to move the permanent magnet, thereby swinging said scanning mechanism.

6. An optical scanner as set forth in claim 5, wherein the permanent magnet is mounted on one of ends of said scanning mechanism opposed to each other in a direction of a swing of said scanning mechanism.

7. An optical scanner as set forth in claim 6, further comprising an inertia body mounted on the other end of said scanning mechanism which adjusts the center of gravity of said scanning mechanism to a desired location.

8. An optical scanner as set forth in claim 7, further comprising second inertia bodies mounted on ends of the scanning mechanism opposed to each other in a direction parallel to the line about which said scanning mechanism swings.

9. An optical scanner as set forth in claim 8, wherein said scanning mechanism has arms extending to a side of emission of the light beam to mount said second inertia bodies thereon.

10. An optical scanner as set forth in claim 1, wherein each of the elastic plates also has a second scanning mechanism-attachment strip, the housing-attachment strip being arranged between the scanning mechanism-attachment strip and the second scanning mechanism-attachment strip.

11. An optical scanner as set forth in claim 10, wherein each of the elastic plates has formed therein slits to define the housing-attachment strip and the scanning mechanism-attachment strips.

12. An optical scanner as set forth in claim 11, wherein an end of each of the slits is rounded.

13. An optical scanner as set forth in claim 1, wherein each of the elastic plates has a waved portion connecting between the housing-attachment strip and the scanning mechanism attachment strip.

14. An optical scanner as set forth in claim 1, wherein each of the elastic plates is made of a spring plate which has the housing-attachment strip formed on a first end thereof and the scanning mechanism-attachment strip formed on a second end opposite the first end and which is so deformed elastically that the ridges defined by the bends of the ends of the housing-attachment strips and the scanning mechanism-attachment strips are arrayed along the line about which said scanning mechanism swings.

15. An optical scanner as set forth in claim 1, wherein the elastic plates are connected to each other to define a one-piece spring plate which has the housing-attachment strip and the scanning mechanism-attachment strip formed on each of opposed ends thereof.

* * * * *